(12) United States Patent
Liu et al.

(10) Patent No.: US 10,892,870 B2
(45) Date of Patent: Jan. 12, 2021

(54) COMMUNICATION OF COMMON CONTROL BLOCKS

(71) Applicant: ZTE Corporation, Guangdong (CN)

(72) Inventors: Xing Liu, Guangdong (CN); Haigang He, Guangdong (CN); Peng Hao, Guangdong (CN); Feng Bi, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/751,181

(22) Filed: Jan. 23, 2020

(65) Prior Publication Data
US 2020/0162217 A1 May 21, 2020

Related U.S. Application Data

(63) Continuation of application No. PCT/CN2017/096872, filed on Aug. 10, 2017.

(51) Int. Cl.
*H04W 4/00* (2018.01)
*H04L 5/00* (2006.01)

(52) U.S. Cl.
CPC .......... *H04L 5/0048* (2013.01); *H04L 5/0007* (2013.01)

(58) Field of Classification Search
CPC ....... H04L 5/0048; H04L 5/007; H04L 5/005; H04L 5/0007; H04L 7/04; H04L 1/0003; H04W 56/0015; H04W 72/0406; H04W 72/042; H04W 88/08; H04W 72/0446; H04B 1/713; H04B 1/692; H04B 1/71637; H04B 1/7183; H04B 2001/6908; H04B 7/2656
See application file for complete search history.

(56) References Cited

U.S. PATENT DOCUMENTS

| | | | |
|---|---|---|---|
| 10,615,897 B2* | 4/2020 | Islam | H04L 27/2613 |
| 2011/0002283 A1* | 1/2011 | Drugge | H04B 1/7103 370/329 |
| 2014/0341175 A1 | 11/2014 | Beale et al. | |
| 2015/0201376 A1 | 7/2015 | Webb et al. | |
| 2016/0218847 A1* | 7/2016 | Zheng | H04W 76/10 |
| 2018/0124689 A1* | 5/2018 | Frenger | H04W 48/16 |
| 2018/0184391 A1* | 6/2018 | Ly | H04W 72/1215 |
| 2019/0082405 A1* | 3/2019 | Ge | H04B 7/0452 |

(Continued)

FOREIGN PATENT DOCUMENTS

| | | |
|---|---|---|
| CN | 101635698 A | 1/2010 |
| CN | 102740372 A | 10/2012 |

(Continued)

OTHER PUBLICATIONS

International Search Report and Written Opinion dated May 2, 2018 for International Application No. PCT/CN2017/096872, filed on Aug. 10, 2017 (8 pages).

(Continued)

*Primary Examiner* — Stephen M D Agosta
(74) *Attorney, Agent, or Firm* — Perkins Coie LLP

(57) ABSTRACT

One or more devices, systems, and/or methods for transmitting time domain location information for a common control block on a physical broadcast channel via a plurality of antenna ports are provided. The common control block is transmitted according to the time domain location information.

4 Claims, 16 Drawing Sheets

(56) References Cited

U.S. PATENT DOCUMENTS

2019/0150110 A1* 5/2019 Ko ............... H04W 72/04 370/350
2019/0349922 A1* 11/2019 Xu ............... H04W 72/0446

FOREIGN PATENT DOCUMENTS

| | | |
|---|---|---|
| CN | 104038320 A | 9/2014 |
| RU | 2536345 | 12/2014 |

OTHER PUBLICATIONS

NTT Docomo, Inc., "Discussion on NR-PBCH contents and payload size," 3GPP TSG RAN WG1 NR Ad-Hoc#2, Qingdao, P.R. China, R1-1711060, 6 pages, Jun. 2017.

Samsung, "NR-PBCH contents and payload size," 3GPP TSG WG1 NR Ad-Hoc#2, Qingdao, P.R. China, R1-1710627, 4 pages, Jun. 2017.

Sharp, "Indication of actually transmitted SS blocks," 3GPP TSG RAN WG1 NR Ad-Hoc#2 Meeting, Qingdao, P.R. China, R1-1711232, 4 pages, May 2017.

MCC Support, "Final Report of 3GPP TSG RAN WG1 #89 v1.0.0 (Hangzhou, China, May 15-19, 2017)," 3GPP TSG RAN WG1 Meeting #90, Prague, Czech Republic, R1-1712031, 165 pages, Aug. 2017.

Ericsson "Further Details of handover execution in NR" 3GPP Draft; R2-1702672; 3rd Generation Partnership Project (3GPP) Apr. 3-7, 2017, 6 pages.

MCC Support, "Draft Report of #GPP TSG RAN WG1 #89 v0.2.0" 3 GPP TSG RAN WG1 Meeting #90, Aug. 21-25, 2017, 166 pages.

ZTE, "4-step RA Procedure" 3 GPP TSG RAN WG1 Meeting #88bis, Apr. 3-7, 2017, 16 pages.

Supplementary EP Search Report 17 92 0946, Aug. 25, 2020, 10 pages.

Russian Search Report for Application No. 2020109669, dated Aug. 11, 2020 with translation, 4 pages.

* cited by examiner

COMMUNICATION OF COMMON CONTROL BLOCKS

CROSS REFERENCE TO RELATED APPLICATIONS

This patent application is a continuation of and claims priority to International Patent Application No. PCT/CN2017/096872, filed on Aug. 10, 2017. The entire content of the before-mentioned patent application is incorporated by reference as part of the disclosure of this application.

BACKGROUND

The number of products and services that utilize the wireless communication spectrum continues to grow as new products emerge. Despite the growing demand for bandwidth in this spectrum, the bandwidth available remains fixed. Commercial communication devices have traditionally used a 300 MHz band, but this band will likely be unable to meet the needs of future wireless communications.

Future wireless communications will utilize more than the fourth generation (4G) communication system, using higher carrier frequencies such as 28 GHz, 45 GHz, etc. Such high frequencies result in a large free transmission loss, so it is necessary to ensure an antenna has sufficient gain to ensure that the high-frequency communications have a signal-to-interference-plus-noise ratio ("SINR") similar to the SINR in the coverage area of conventional 4G LTE systems. Since the carrier frequency corresponding to the high frequency communication has a shorter wavelength, it is possible to ensure that more antenna elements can be accommodated per unit area, and more antenna elements mean that beamforming can be used to improve Antenna gain, thus ensuring high-frequency communication coverage performance.

Using the beamforming method, the base station or other transmitter can focus energy in a certain direction, while in other directions the transmission energy can be relatively small. In other words, each beam has its own direction, and each beam can be focused in its own direction relative to the base station. To ensure sufficient coverage of the communication region of the transmitter, the base station can transmit multiple beams in different directions once communications between the base station and a remote node has been established. For large communication regions, the number of beams transmitted to achieve sufficient coverage throughout the communication region can be in the tens or even hundreds. In order to meet the initial access requirements to first establish communications between the base station and remote nodes within the communication region, however, it is necessary to realize omni-directional coverage of the system broadcast message. Transmitting the system broadcast message with so many antennas or broadcasting the system broadcast message imposes large demands on system resources.

SUMMARY

In accordance with the present disclosure, a device and/or method is/are provided for transmitting time domain location information for a common control block on a physical broadcast channel via a plurality of antenna ports. The common control block is transmitted according to the time domain location information.

As another example, a device and/or method is/are provided for receiving time domain location information for a common control block on a physical broadcast channel that has been broadcast via a plurality of antenna ports. The common control block is received once transmitted according to the time domain location information.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1A:
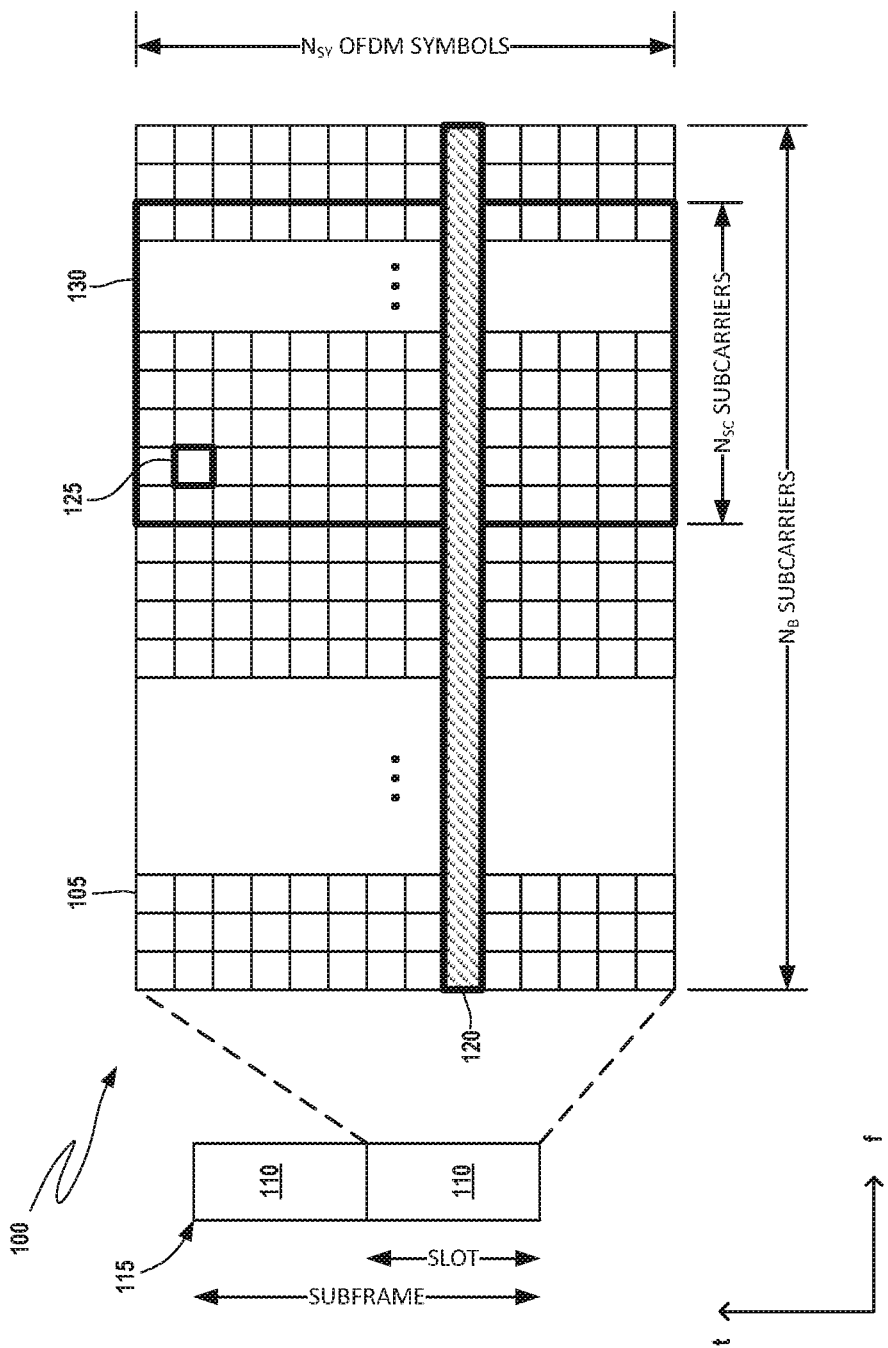
FIG. 1A is an illustrative structure of a time-frequency grid of a radio resource for transmitting data and control channels in a downlink of a wireless communication system.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative. Such embodiments may, for example, take the form of hardware, software, firmware or any combination thereof.

In the next generation wireless communication system (e.g., New Radio or "NR"), system information is divided into minimum system information (MSI) and other system information ("other SI"). The minimum system information is further divided into main system information ("MIB") carried on a physical broadcast channel ("PBCH"), and remaining minimum system information ("RMSI") carried on a physical downlink shared channel (e.g., physical downlink shared channel or "PDSCH"). The main system information MIB is used to provide the basic system parameters of the cell, and the remaining minimum system information RMSI is used to provide the initial access related configuration information such as the initial access request transmission configuration, the initial access response message reception configuration, and the like.

The RMSI is scheduled by the physical downlink control channel ("PDCCH") and carried on the PDSCH. The time-frequency domain location of a common control resource set ("CORESET") where the RMSI scheduling information is located can be indicated in the PBCH. In the NR system, the PBCH is carried in synchronization signal/physical broadcast channel blocks ("SS blocks or "SSBs"). A plurality of SSBs are included in one synchronization period. Different SSBs with synchronization signal and PBCH can be transmitted in the same or different beam directions or antenna ports, for achieving the full coverage of the communication region. The antenna ports are logical ports, for signal transmission under like channel conditions. For example, for operating modes in the downlink direction for which an independent channel is assumed (e.g. SISO vs. MIMO), a separate logical antenna port can be defined. The PBCH of the different beam directions or antenna ports has the need for combination reception, so the present system and method involves transmitting the same content in the different beam directions or antenna ports.

In order to ensure the flexibility of data transmission, however, the relationship between the time domain position of different SSBs and the time domain position of the corresponding CORESET in the different beam directions or antenna ports may be different. To allow this flexibility without interfering with combination reception of PBCH from different beam directions or antenna ports, a system and method disclosed herein ensures that the time domain location of the CORESET, or at least a common control block ("CCB") including the CORESET is accurately indicated in a plurality of different beam directions or different antenna ports.

One or more computing devices and/or techniques for communicating control blocks between nodes in a communication network to establish wireless communications in different cells are provided. For example, a base station ("BS"), as an example of a node that includes a cellular antenna to establish a cell or "communication region" in the communication network. The BS for example, may communicate with a user equipment ("UE"), forming a second node in the communication network while the UE is located within the cell established by the BS. To initially establish communications, the BS transmits time domain location information for a CCB on a physical broadcast downlink channel via a plurality of antenna ports of the BS.

The CCB can optionally be transmitted on one or a plurality of different physical downlink channels according to the time domain location information in combination with synchronization signal blocks ("SSBs"). The SSBs and the CCB can be mapped to data transmission slots comprising one or a plurality of Orthogonal Frequency Division Multiplexing ("OFDM") symbols, optionally in each of a plurality of consecutive slots.

Embodiments of the time domain location information can include information corresponding to the antenna port of SSB to which the physical broadcast channel belongs. For example, the time domain location information can include at least one, optionally a plurality of, or optionally all of: (i) a starting point of the CCB in the time domain, indicating a time when transmission of the CCB by the BS is to begin; (ii) a pattern in which SSBs are actually transmitted by the BS; (iii) a pattern in which the potential CCBs are mapped to data transmission slots, or OFDM symbols, in the plurality of slots; (iv) a quantity of potential CCBs assigned to one SSB; (v) an offset between the start point of potential CCBs corresponding to two neighboring SSBs; or (vi) one or more parameters of a monitoring cycle during which UE is to blindly detect whether the actual transmitted CCB has been received. Examples of the parameters of the monitoring cycle can include one or more of a monitoring period during which the UE is to perform the blind detection, a maximum number of blind detections to be performed by the UE before determining that the downlink control information of the CCB is detected, a time duration of monitoring that is to be performed by the UE before determining that the downlink control information is detected, or a common control resource set configuration within the common control block.

Embodiments of the CCB can include Common Control Resource set (Common CORESET). The common CORESET carries at least a portion, and optionally all of the common control information for the specific beam direction or antenna port of the BS from which the CCB is transmitted. Examples of the information included within the common CORESET can include at least one, and optionally a plurality or all of: paging downlink control information, scheduling information of the remaining minimum system information, paging indication information, etc. Wherein the paging indication used for triggering user equipment to report downlink antenna port information for subsequent paging transmission. In other words, the CCB sends common control information for a particular downlink antenna port/downlink beam direction. During one sweeping period, one or more common control blocks CCB are used to complete common control information transmission of all downlink antenna ports/downlink beam directions. Embodiments of the CCB can be a slot or mini-slot comprising one or more OFDM symbols. Examples of the information conveyed in the CCB include at least one, optionally a plurality of, or optionally all of: the paging message, the remaining minimum system information, etc., in addition to the common CORESET.

The common CORESET can, being configured within the CCB, can comprise at least one of a number of OFDM symbols occupied by the CCB, and at least one of a number of resource elements (RE) occupied by the CCB. The common control resource set configuration can include at least one, and optionally a plurality or all of: number of symbols occupied the common control resources set, a time domain relative position within the CCB, number of resource elements occupied the common control resources set, or a frequency domain relative position within the CCB.

With reference to the drawings, the communication technique utilized by the cellular communication system can be Orthogonal Frequency Division Multiplexing (OFDM). FIG. 1A illustrates a structure of time-frequency grid 100 of radio resources for transmitting data and control channels (e.g., PBCH) in a downlink of a wireless communication system utilizing OFDM. In FIG. 1A, the horizontal axis denotes frequency f, and the vertical axis denotes time t. An OFDM symbol 120, is shown as string of REs with the bold outline arranged along the frequency axis in FIG. 1A, and is the smallest transmission unit on the time axis. A slot 110 includes $N_{SY}$ OFDM symbols. Although N is equal to 14 according to embodiments described herein for illustration purposes, the value of N according to some embodiments can be any integer value such as 7, 14, 21, etc., depending on factors such as subcarrier spacing, for example. A subframe 115 includes two slots 110. A slot 110 is approximately 0.5 ms in duration, and a subframe is approximately 1.0 ms in duration. A subcarrier, arranged in column 105 in FIG. 1A, is the smallest transmission unit in the frequency domain, and the entire system transmission band includes $N_B$ subcarriers.

In the time-frequency grid 100, a Resource Element ("RE") 125 is the basic unit indicated by a discrete OFDM symbol index and a discrete subcarrier index. The Resource Block ("RB") or Physical Resource Block 130 includes the 14 consecutive OFDM symbols in the time domain t in FIG. 1A and the $N_{SC}$ consecutive subcarriers in the frequency domain 110. For some embodiments, the value of $N_{SC}$ can be any integer such as 6, 12, 18, etc., but will be described herein as being equal to 12 for the sake of brevity and clarity. Accordingly, an RB 130 includes $N_{SY} \times N_{SC}$ REs, or 14×12 in the illustrated examples. An RB is the smallest unit that can be scheduled for transmission.

, The control information such as the time domain location information includes an indicator that indicates the number of OFDM symbols and the number of REs carrying common CORESET. For example, the common CORESET is transmitted in X OFDM symbols and Y REs. Embodiments of X can be 1, 2, 3, 4, etc. And Y is positive integer.

Figure 2:
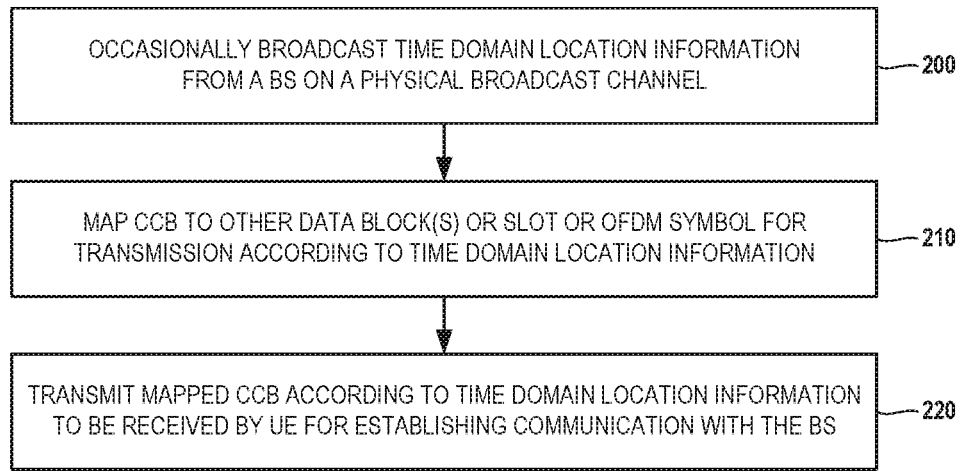
FIG. 2 is a flow chart schematically illustrating an embodiment of a method for transmitting time domain location information usable by UE within a communication region to locate a common control block.

An example of a method for transmitting time domain location information that is usable by the UE to locate a CCB is illustrated in FIG. 2. At 200, the BS occasionally, or optionally periodically transmits time domain location information on the PBCH or other public channel that can be received and interpreted by UE within range without first receiving configuration information specifically for communicating with that BS. Once received by the UE, the time domain location information notifies the UE when to expect reception of the CCB, or optionally the CORESET within the CCB.

The time domain location information can include any information that allows the UE to differentiate the CCB from other data received from the BS during transmission of the SSBs. The time domain location information can be objective information that specifies a point in time when the CCB is to be transmitted and received, or relative information that specifies the time when the CCB is to be transmitted and received relative to a reference point. The reference point can be a start point when other data begins to be transmitted or is finished being transmitted, or can be a position within a transmission relative to other data transmitted during that same transmission.

For example, the time domain location information can include the Master information block ("MIB") broadcasted by the BS on the PBCH. Time domain location information to be used by UE to locate the CCB or common CORESET for the specific communication region where the UE is located can be found within the MIB, such as in the first M OFDM symbols of a subframe of a radio frame, where M can be any integer value such as 1, 2, 3, 4, 5, 6, 7, 8, etc. In the frequency domain, the MIB occupies a defined number of subcarriers (e.g., 72) known to the BS and UE. MIB carries little, but important information for UE initial access. The MIB can be occasionally or periodically broadcasted on the PBCH, such as every $N^{th}$ radio frame (wherein N can be any integer value such as 1, 2, 3, 4, 5, 6, etc.), within each 10 ms radio frame, or at any other regularly-scheduled time such as once within each slot 110.

Specific examples of the time domain location information can include at least one, optionally a plurality of, or optionally all of: (i) a starting point of the CCB in the time domain, indicating a time when transmission of the CCB by the BS is to begin; (ii) a pattern in which SSBs are actually transmitted by the BS; (iii) a pattern in which the potential CCBs are mapped to data transmission slots, or OFDM symbols, in the plurality of slots; (iv) a quantity of potential CCBs assigned to one SSB; (v) an offset between the start point of potential CCBs corresponding to two neighboring SSBs; or (vi) one or more parameters of a monitoring cycle during which UE is to blindly detect whether the CCB has been received. Examples of the parameters of the monitoring cycle can include one or more of a monitoring period during which the UE is to perform the blind detection, a maximum number of blind detections to be performed by the UE before determining that the downlink control information of the CCB is detected, a time duration of monitoring that is to be performed by the UE before determining that the downlink control information is detected, or a common control resource set configuration within the common control block.

For embodiments that transmit a time domain start point, or reference to a start point as the time domain location information, such a time domain start point may be described by at least one of, optionally a plurality of, or optionally all of: a radio frame number in which the first potential CCB is located, a subframe number in which the first potential CCB is located, a first slot number in which the potential CCB is located, a symbol index (e.g., $N_{SY}$ value) of the first potential CCB, the radio frame number offset between the first potential CCB and the first SSB, the subframe number offset between the potential CCB and the first SSB, a slot number offset between the first potential CCB and the first SSB, or a symbol number offset between the first potential CCB and the first SSB.

Regardless of the type of time domain location information transmitted, the BS maps the CCB to OFDM symbols in the data transmission slots 110 at 210 to comply with the time domain location information transmitted by the BS at 200. The BS then transmits the mapped CCB, including the common CORESET, at 220 in accordance with the transmitted time domain location information. In other words, the CCB is transmitted by the BS at the specific times indicated by the time domain location information to be detected by the UE.

Figure 3:
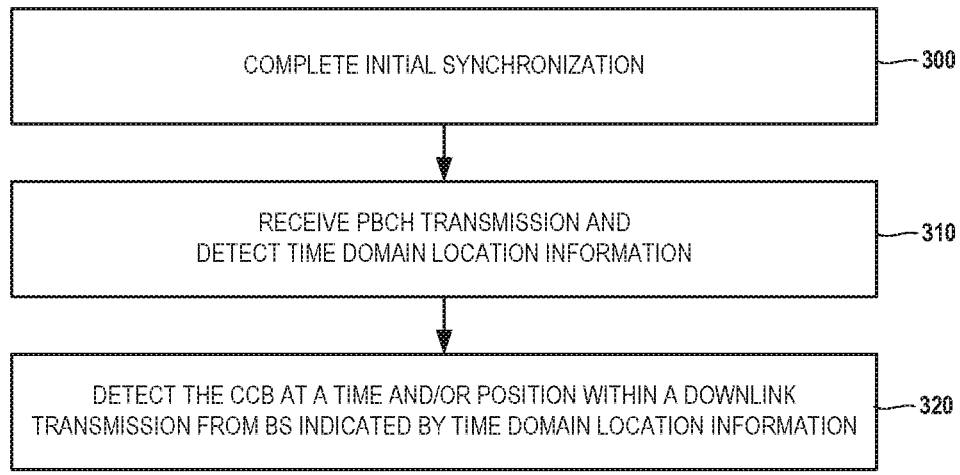
FIG. 3 is a flow chart illustrating an embodiment of a method performed by UE to establish communications with a BS.

An embodiment of a method performed by UE to establish communications with the BS is illustrated in FIG. 3. Upon entering the effective communication range of the communication region established by a BS, the UE completes initial cell synchronization at 300. Once synchronized with the BS, the UE begins to establish initial access to the network via the BS by receiving the PBCH transmission and detecting the time domain location information specific to the beam direction or antenna port that transmitted the PBCH at 310. At 320, the UE detects the CCB at the time/frequency domain position within a downlink transmission from the BS specified by the time domain location information at 320 to establish communication with the BS.

Figure 4:
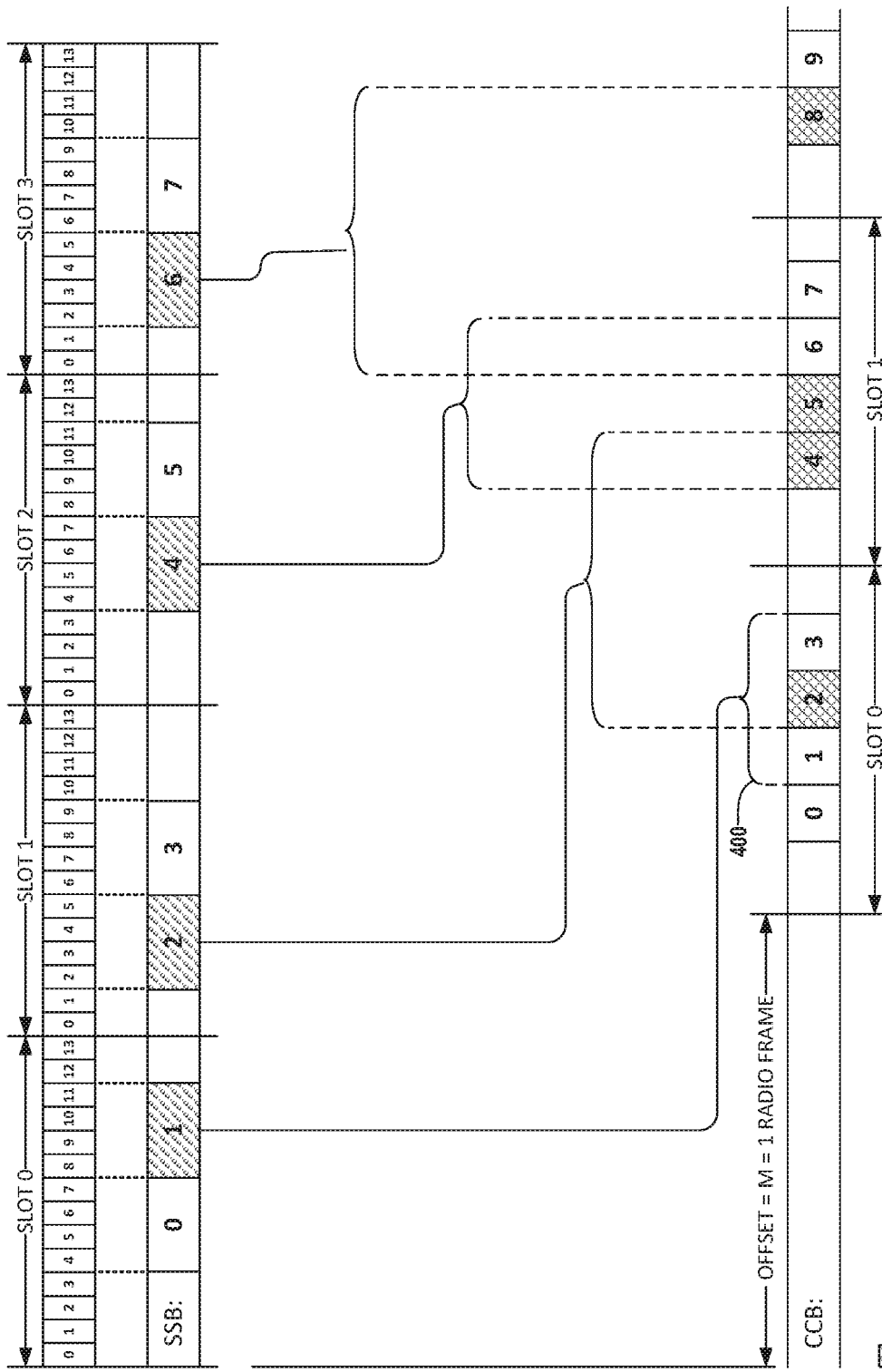
FIG. 4 shows an illustrative example of a mapping pattern between OFDM symbols, SSBs and CCBs.

Mapping the CCB to a transmission time, slot, OFDM symbols, another data block, etc. specified by the time domain location information at 210 can be accomplished in a variety of ways. For example, and with reference to FIG. 4, the SSBs(0-7) and CCBs(0-9) are defined as potential SSBs and CCBs, meaning they are available for use. SSBs and CCBs that are actually transmitted are shown with cross hatching in FIG. 4. Parts of them are selected by BS to be actually transmitted to the UE. There are four (4) slots, designated slot 0, slot 1, slot 2, slot 3, each including fourteen (14) OFDM symbols 0-13. The number of potential SSBs in the embodiments shown in FIG. 4 is designated by the letter "L," and L is equal to 8. The SSBs are assigned an index value from zero (0) to seven (7) (designated SSB0, SSB1, SSB2, SSB7), and each SSB occupies four (4) consecutive symbols as shown in Table 1:

TABLE 1

| SSB No. | Slot No. | OFDM Symbols | CCB Nos. |
|---|---|---|---|
| SSB0 | 0 | 4-7 | 0, 1, 2 |
| SSB1 | 0 | 8-11 | 1, 2, 3 |
| SSB2 | 1 | 2-5 | 2, 3, 4 |
| SSB3 | 1 | 6-9 | 3, 4, 5 |
| SSB4 | 2 | 4-7 | 4, 5, 6 |
| SSB5 | 2 | 8-11 | 5, 6, 7 |
| SSB6 | 3 | 2-5 | 6, 7, 8 |
| SSB7 | 3 | 6-9 | 7, 8, 9 |

For example, each potential SSB corresponds to three potential CCBs. SSB0 corresponds to CCBs 0, 1 and 2, as designated by the bracket 400 in FIG. 4. The offset M between the starting points of the potential CCBs corresponding to the two adjacent SS blocks is M=1, that is, one (1) CCB. In other words, since the first potential CCB corresponding to SSB0 is CCB0, and the first potential CCB corresponding to SSB1, which is immediately adjacent to SSB0, is CCB1, the offset between CCB1 and CCB0 is one (1) CCB. Similarly, since the first potential CCB corresponding to SSB3 is CCB3, and the first potential CCB corresponding to SSB4, which is immediately adjacent to SSB3, is CCB4, the offset between CCB4 and CCB3 is again one (1) CCB. A total of ten (10) CCBs are required in the embodiment shown in FIG. 4, as given by M×L+N−M=1× 8+3−1=10 CCB, where N is the maximum number of potential SSBs corresponding to potential CCBs.

The potential CCBs corresponding to different potential SSBs can overlap, and each actual transmitted SSB will correspond to an actual transmitted CCB. The actually transmitted CCB is selected randomly from one of the three potential CCB resources corresponding to the SSB, however, the CCBs that are selected to be actually transmitted are chosen so the selected CCBs do not overlap. In the present embodiment shown in FIG. 4, actually-transmitted SSB1 and actually-transmitted SSB2 both correspond to CCB2. However, since CCB2 is selected for transmission with SSB1, CCB2 is not available as an option to be transmitted with SSB2. Thus, SSB1 corresponds to CCB2, and SSB2 is selected to correspond to CCB4. Also, SSB4 corresponds to CCB5, SSB6 is randomly chosen to correspond to CCB 8.

Figure 1B:
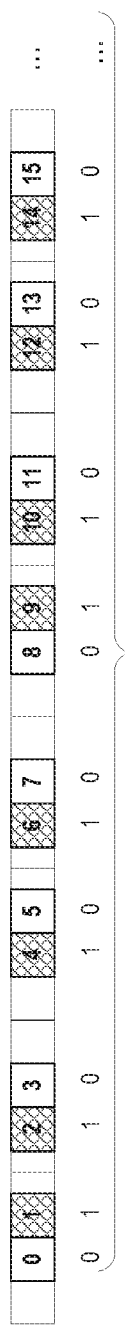
FIG. 1B shows a form of indication by transmitting a bitmap of actual transmitted blocks.

In some embodiments, actual transmitted SSB positions can be indicated to UE by the following methods:

Method 1: bitmap. A direct way of informing positions of the actual transmitted SSBs is to use a bitmap for each SSB, as shown in FIG. 1B. Full flexibility can be obtained by indicating each SSB status. The maximum number of SSB indices will be 64 for above 6 GHz, which means 64 bits would be required. This is a large signaling overhead.

Figure 1C:
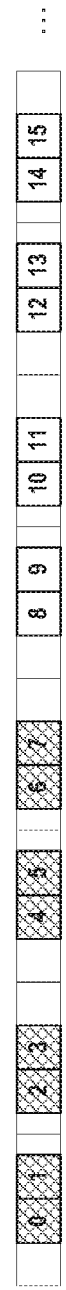
FIG. 1C shows a form of indication by transmitting a number of actually-transmitted SS blocks.

Method 2: number. Another way is by informing the number(X) of the actual transmitted SSBs, and defining the mapping order of each SSB. As shown in FIG. 1C, the actual transmitted SSBs will be located at the first X of nominal SSBs with the front to back mapping order. Apparently, the signaling overhead can be reduced, only 6 bits will be needed for the case of 64 SSBs. On the other hand, more than one continuous slot will be blocked from other service transmission or some expected SSBs will be punctured. That is to say, flexibility of configuration will be restricted.

Method 3: combination of bitmap and number. It is better to reserve some candidate SSBs resource for URLLC-like service transmission rather than puncture SSBs expected to transmit especially for the case that less SSBs are needed.

Two types of SSB can be defined for above purpose.

Type 1 SSBs can be restricted for mapping from front to back. And the number of such SSBs is enough for indicating whether actual transmitted of such SSBs.

Type 2 SSBs are selected for potential URLLC-like service transmission, and bitmap seems to be a reasonable scheme to indicate whether the SSB actually transmitted or not.

Figure 1D:
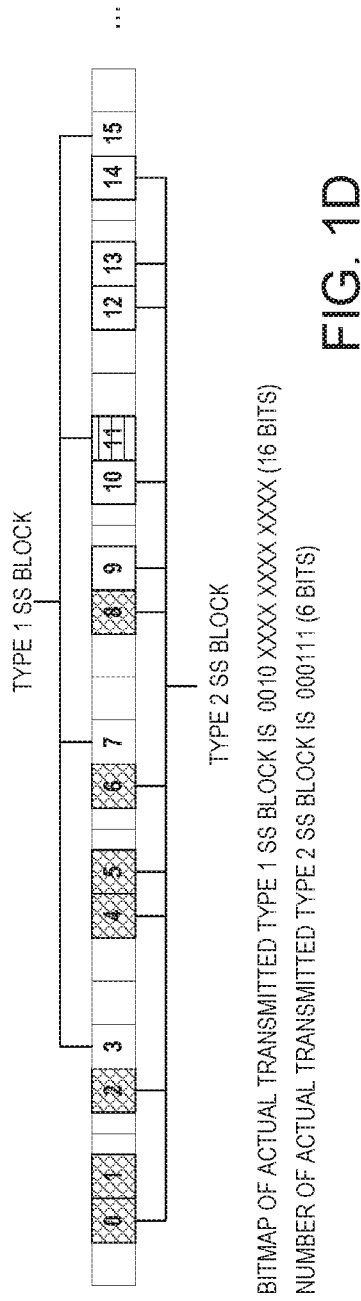
FIG. 1D shows a form of indication by combination of bitmap and number.

As shown in FIG. 1D, one of every four SSBs has been defined as Type 1 SSB. For the case of 64 SSBs, the number of Type 1 SSB is 16, and in total 16 bits are needed for indicating transmission status of Type 1 SSBs. The other SSBs are classified into Type 2 SSBs, and 6 bits are needed for such indicating.

It seems to be a compromise between method 1 and method 2. That is to say, method 1 can be obtained by setting the number of type 1 SSBs equal to the maximum number of SSBs. On the contrary, when we set number of type 2 SSBs equal to the maximum number of SSBs, method 2 would be adopted. So a balance between signaling overhead and flexibility can be made by selecting a reasonable ratio of number of two types SSBs.

Figure 1E:
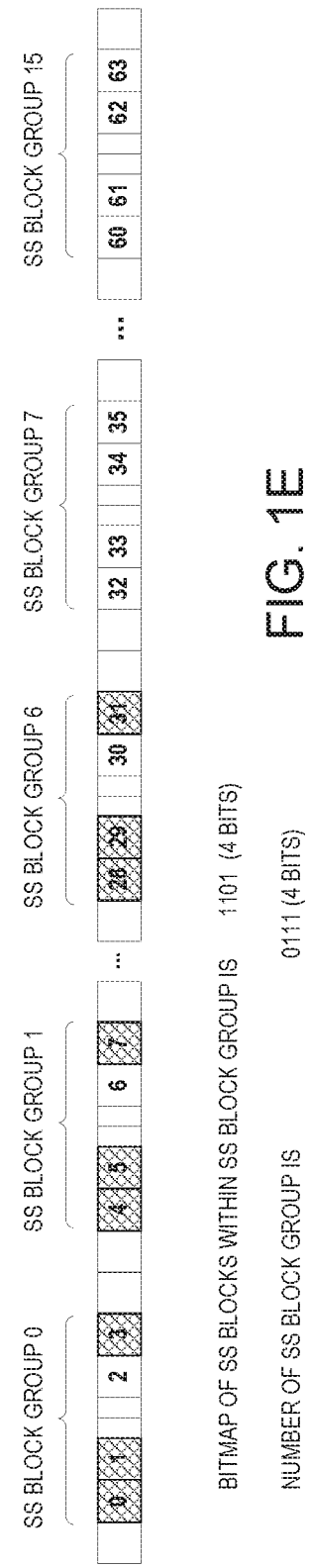
FIG. 1E shows another form of indication by combination of bitmap and number.

Another form of indication by combination of bitmap and number is shown in FIG. 1E. The candidate SSBs are divided into SSB groups.

Bitmap is adopted for indicating actual transmitted SSBs within SSB group.

Different SSB groups share the same pattern of actual transmitted SSBs.

Number of SSB groups containing actual transmitted SSBs is further involved.

Let's take 4 SSBs in a SSB group and total 64 potential SSBs as an example. Four bits are needed for indicating actual transmitted SSBs within a SSB group. Another four bits are introduced for further indicating number of SSB groups containing actual transmitted SSBs. Specifically, four bits for indicating actual transmitted SSBs within a SSB group is 1101, that means the first, second and fourth SSBs in one group are actual transmitted. Another four bits indicating number of SSB groups containing actual transmitted SSBs is 0111, which means the first seven SSB groups containing actual transmitted SSBs, and these seven SSB groups share the same pattern (1101) of actual transmitted SSBs within a SSB group.

It is worth noting that the number of SSBs in a SSB group can be set to any value less than or equal to number of potential SSBs.

Method 4: combination bitmap and bitmap. In another embodiment also shown in figure M, the candidate SSBs are divided into SSB groups. The indication method can be described as combination of bitmap for SS blocks within a SS block group and another bitmap for SS block groups.

Bitmap is adopted for indicating actual transmitted SSBs within SSB group.

Different SSB groups share the same pattern of actual transmitted SSBs.

Another bitmap for SSB groups containing actual transmitted SSBs is further involved.

Let's take 4 SSBs in a SSB group and total 64 potential SSBs as an example. Four bits are needed for indicating actual transmitted SSBs within a SSB group. Another sixteen bits are introduced for further indicating bitmap for SSB groups containing actual transmitted SSBs. Specifically, four bits for indicating actual transmitted SSBs within a SSB group is 1101, that means the first, second and fourth SSBs in one group are actual transmitted. Another sixteen bits indicating number of SSB groups containing actual transmitted SSBs is 1111 1110 0000 0000, which means the first seven SSB groups containing actual transmitted SSBs, and these seven SSB groups share the same pattern (1101) of actual transmitted SSBs within a SSB group.

It is worth noting that the number of SSBs in a SSB group can be set to any value less than or equal to number of potential SSBs.

Figure 6:
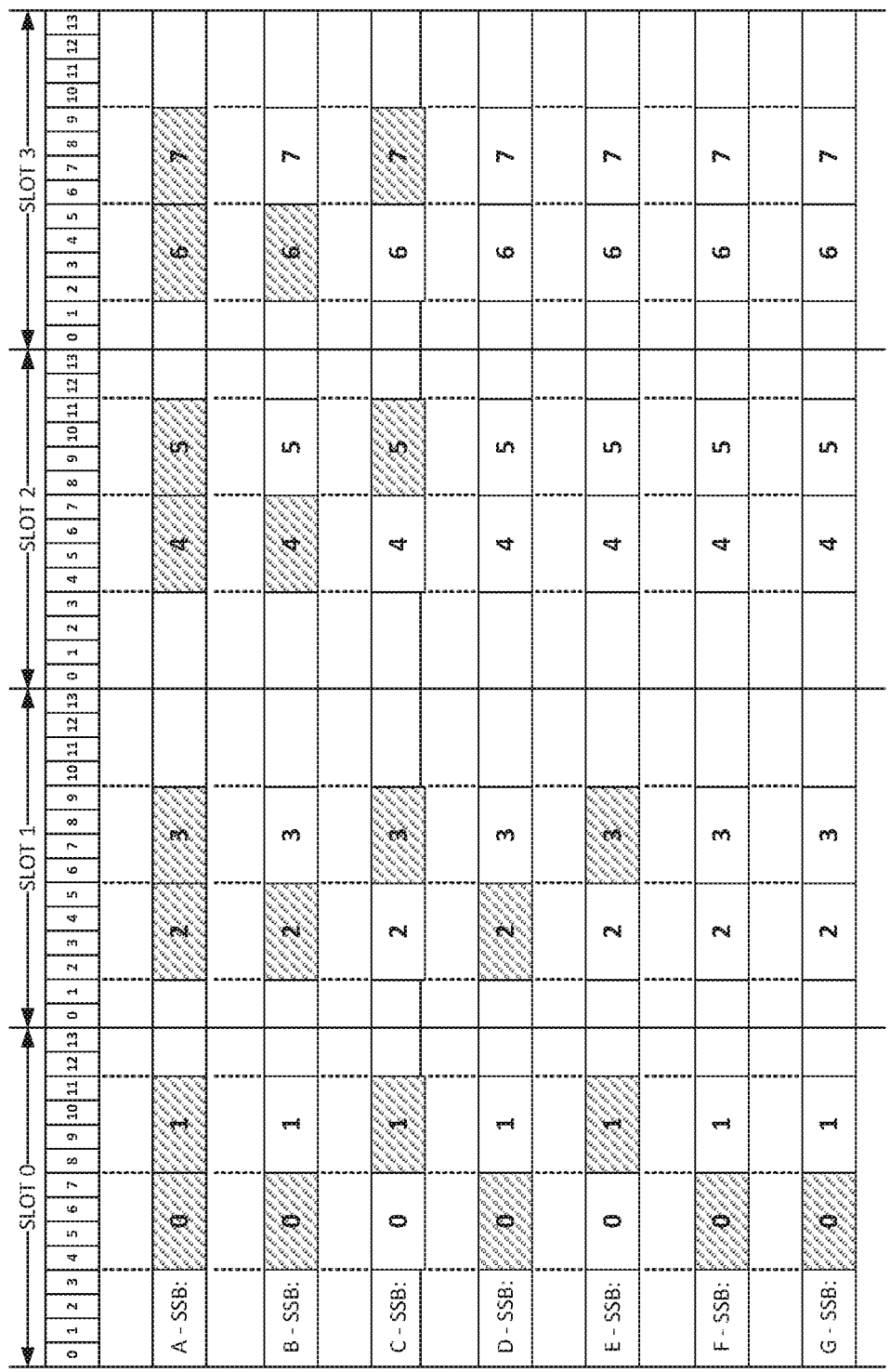
FIG. 6 shows a plurality of available SSB patterns for actual transmission.

Method 5: pattern. Some patterns of the actual transmitted SSBs can be predefined, and the pattern index will be configured to the UEs for indicating the actual transmitted SSB positions. In theory, quite a large number of actual transmitted SSBs patterns need to be defined for reaching full of flexibility. It is a huge amount of overhead. For the sake of simplification, some typical patterns will be selected and predefined. As shown in FIG. 6, seven patterns are defined under the case of 8 SSBs. It's worth noting that only a part of the actual transmitted SSB number has been supported. Some cases, such as 3, 5, 6, 7 actual transmitted SSBs are not allowed. For some existing number, positions of actual transmitted SSBs are restricted to a certain extent. A balance between signaling overhead and flexibility may also be considered by defining a reasonable pattern number.

The position(s) of actually transmitted SSBs can be informed to both IDLE and CONNECTED UEs in the PBCH or RMSI or other SI or dedicated RRC signal.

The mapping pattern from the CCBs to the data transmission slots is also predefined. For the mapping pattern shown in FIG. 4, it is assumed that each instance of the CCB occupies two OFDM symbols. The OFDM symbols in a slot are occupied by the CCBs designated in the same slot as shown in FIG. 4. Thus, in FIG. 4, CCBs 0, 1, 2, 3 have been designated in slot 0, so the CCBs in slot zero are mapped to the OFDM symbols in slot 0, namely, symbols 4 to 5, symbols 6 to 7, symbols 8 to 9, and symbols 10 to 11, respectively. Similarly, CCBs 4, 5, 6, 7 in slot 1, are mapped to symbols 2 to 3, symbols 4 to 5, symbols 6 to 7, symbols 8 to 9, respectively, in slot 1. And CCBs 8, 9 are mapped to symbols 4 to 5, and symbols 6 to 7, respectively, in the slot 2.

In the present example, the actual transmitted SSBs are SSB1, SSB2, SSB4 and SSB6, as designated by the use of cross hatching in FIG. 4, to ensure that the PBCH within the actual transmitted SSBs can be combined, and that each PBCH transmission including the time domain location information contains the same content. Based on the above description, PBCH specific content is as follows:

CCB time domain start point: offset from SSB starting point to 1 radio frame (ie 10 ms);

The mapping pattern of CCB to data transmission slot is: the pattern shown in FIG. 4;

Each SSB corresponds to N=3 potential CCBs; and

The offset M between the starting points of the potential CCBs corresponding to two adjacent SSBs is M=1.

For the values configuration of M and N, a set of typical values can be predefined, and which value currently used can be indicated by PBCH. For example, it is predefined that M=1 or 2, and one bit will be needed for indicating current value of M. Such as, the value of such bit '0' represents 'M=1', and the value of such bit '1' represents 'M=2'. Similarly, it can predefine that N=3 or 5, and one bit will be needed for indicating current value of M. Such as, the value of such bit '0' represents 'N=3', and the value of such bit '1' represents 'N=5'.

It is worth noting that the values of N and M can also be defined fixedly in the specification. In such cases, the relevant information will not be included in the PBCH. For example, N=3 and M=1 have been defined in the specification, the relevant information domain will be omitted.

After receiving the PBCH transmission, the UE obtains the above information and can directly find the CCB time domain start point. Then, the UE judges the CCB corresponding to the received SSB. In the SSB, the UE can obtain other information such as the SSB index. For example, the SSB index is indicated by the PBCH Demodulation Reference Signal ("DMRS") and defines eight different DMRS sequences. The UE can determine the current SSB index by detecting the current PBCH DMRS sequence index. For example, the UE recognizes that the current SSB index is 4, and further estimates that the potential CCBs corresponding to SSB4 is CCB4, CCB5, or CCB6. (That is, since the offset between the starting points of the potential CCBs corresponding to two adjacent SSBs is M=1, the first potential CCB corresponding to SSB4 is CCB4, and since each SSB corresponds to the number of potential CCB resources N=3, further confirming that CCB may be CCBs 4, 5, or 6).

The UE then determines the specific time domain resource location of the CCB resources 4, 5, and 6 according to the mapping pattern of the CCB to the data transmission slot. The UE performs a blind detection on CCBs 4, 5, and 6 to determine that the actual transmitted CCB is CCB 5, as shown in FIG. 4. It is worth noting that CCB4 is also an actual transmitted CCB corresponding to SSB2. But the UE can only detect CCB5. This is because CCB4 and CCB5 are transmitted by different downlink antenna ports, and the UE under the downlink antenna port corresponding to SSB4. That is also the downlink antenna port used for CCB5.

The relative position of the common CORESET within CCB5 may be pre-defined by the system or indicated in the PBCH. The relative position information includes at least one of the number of symbols occupied by the common CORESET in the determined CCB5, the time-domain relative position of the common CORESET within CCB5, the number of resource elements occupied by the common CORESET, a position of a set of common control resources in the frequency domain relative to CCB5, etc.

The UE completes the acquisition and reception of the CCB time domain information, further detects the downlink common control information in the common control resource set and receives the common data (such as RMSI, paging message, etc.) according to the received downlink common control information.

The PBCH can also indicate the frequency domain resources of the CCB. If the UE determines the time domain position of the CCB, it may also be necessary to determine the frequency domain position of the CCB according to the indication of the PBCH.

Figure 5:
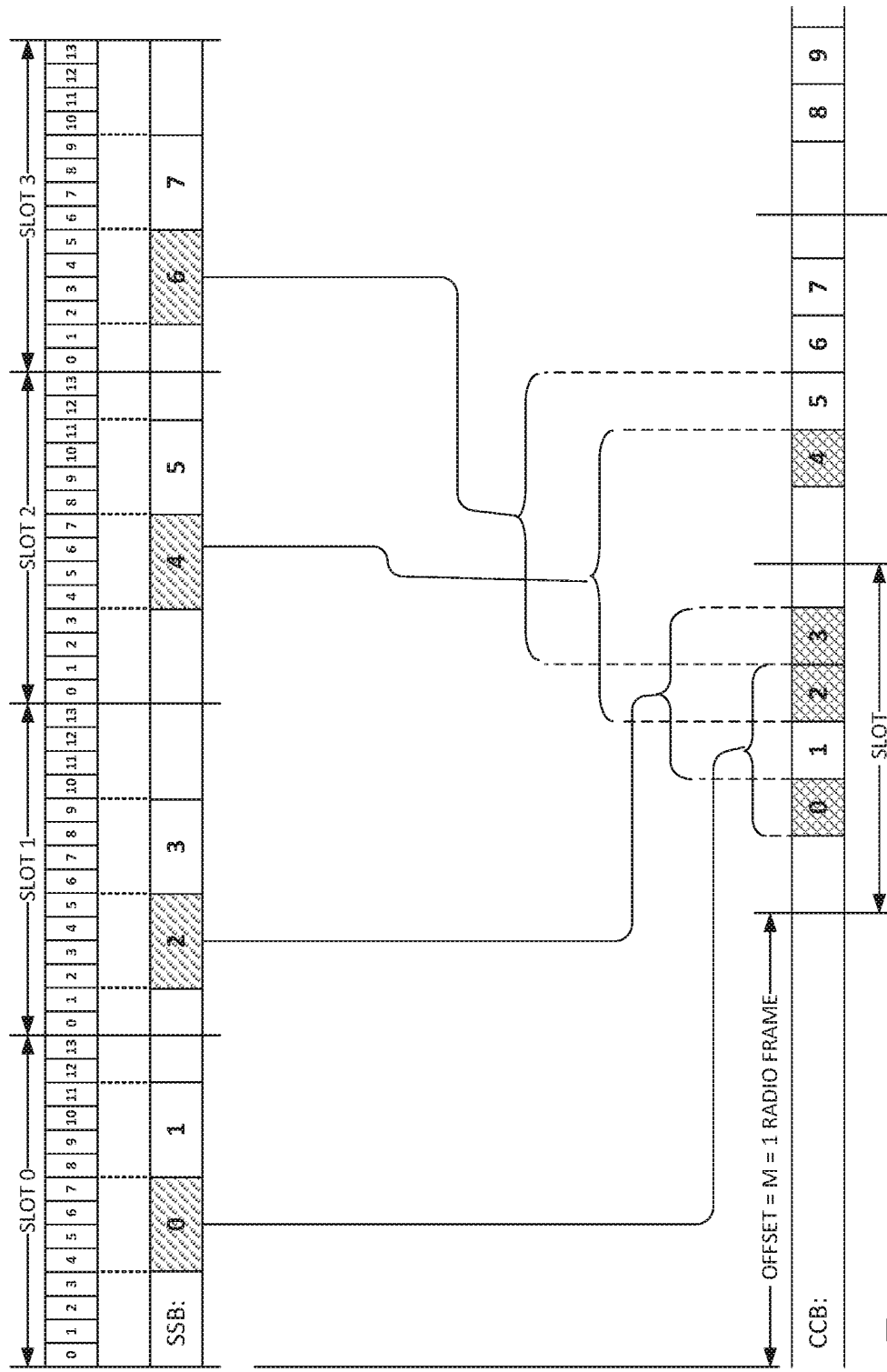
FIG. 5 shows another illustrative example of a mapping pattern between OFDM symbols, SSBs and CCBs, wherein the CCBs are concentrated to shorten a reception delay of the CCBs.

Some embodiments concentrate the CCBs that are to be transmitted to shorten a reception delay of the CCB. An illustrative example of a mapping pattern with concentrated CCBs is shown in FIG. 5. Just as the previous example, the number of potential SSBs is L=8 (that is, SSB indexes of 0-7), and each SSB occupies 4 consecutive OFDM symbols. FIG. 5 shows the mapping pattern of potential SSBs to the data transmission time slot, which is summarized in Table 2, below. The mapping pattern is known to the network side (e.g., the BS) and the UE.

TABLE 2

|      | Slot No. | OFDM Symbols | CCB Nos. |
|------|----------|--------------|----------|
| SSB0 | 0        | 4-7          | 0, 1, 2  |
| SSB1 | 0        | 8-11         | NULL     |
| SSB2 | 1        | 2-5          | 1, 2, 3  |
| SSB3 | 1        | 6-9          | NULL     |
| SSB4 | 2        | 4-7          | 2, 3, 4  |
| SSB5 | 2        | 8-11         | NULL     |
| SSB6 | 3        | 2-5          | 3, 4, 5  |
| SSB7 | 3        | 6-9          | NULL     |

In the present example, a set of potential CCBs is configured for each of the actually transmitted SSBs. There are a plurality (e.g. seven) of possible patterns of the SSBs predefined in the system as shown in FIG. 6. The BS includes a 3-bit identifier in the transmission on the PBCH to the UE to indicate the current pattern being used. In the present example, the pattern identified by the label "B-SSB:" in FIG. 6 is being used. There is the potential for overlapping CBBs. For instance, potential CCBs 0, 1, 2 correspond to SSB0, and potential CCBs 1, 2, 3 correspond to SSB2. Thus, the potential CCBs 1 and 2 are corresponding to both SSB0 and SSB2.

The mapping pattern from potential CCBs to the data transmission slots is also predefined, such as the pattern shown in FIG. 5. Assuming again that each potential CCB occupies two OFDM symbols, and using the SSB mapping pattern to the data transmission slots shown in FIG. 5, potential CCB 0, 1, 2, 3 are mapped to symbols 4 to 5, symbols 6 to 7, symbols 8 to 9, and symbols 10 to 11, respectively, in slot 0; potential CCB 4, 5, 6, 7 are mapped to Symbols 2 to 3, symbols 4 to 5, symbols 6 to 7, and symbols 8 to 9 in slot 1; potential CCB 8, 9 are mapped to symbol symbols 4 to 5, symbols 6 to 7 of slot 2.

The PBCH specific content included in the time domain location information is as follows:

CCB time domain start point: time domain offset from SSB starting point is 1 radio frame (i.e. 10 ms)

The mapping pattern of CCB to data transmission slot is as shown in FIG. 5;

Each SSB corresponds to N=3 potential CCBs; and

The offset between the starting points of the potential CCBs corresponding to two adjacent actual transmitted SSBs is M=1.

After receiving the time domain location information with the SSB on the PBCH, the UE obtains the above information and can directly find the potential CCB time domain start point. Then, the UE judges the CCB corresponding to the received SSB. In the SSB, the UE can obtain other information such as the SSB index. For example, the SSB index is indicated by PBCH DMRS and defines eight different DMRS sequences. The UE can determine the current SSB by detecting the current PBCH DMRS sequence Index. For the present example, the UE recognizes that the current SSB index is 4. The UE further infers that the potential CCBs corresponding to SSB4 are 2, 3, 4, as summarized in Table 2, above. That is, since the SSB pattern of FIG. 5 is actually transmitted, the SSB with SSB index 4 is the third SSB actually transmitted by the network side; the offset between the starting points of the potential CCB resources corresponding to the two adjacent SSBs; the first CCB corresponding to the third actual transmitted SSB (i.e., SSB4) is CCB2, and the number of potential CCBs corresponding to each SSB is N=3, further confirming that the CCB may carry CCB resources 2, 3, 4.

The UE then determines the specific time domain resource location of the CCB resources 2, 3 and 4 according to the mapping pattern of the potential CCBs to the data transmission slots. The UE performs a blind detection on CCBs 2, 3, 4 to determine that the actual transmitted CCB is CCB3. As shown in FIG. 5, the CCB0 corresponds to SSB0, CCB2 corresponds to SSB2, CCB3 corresponds to SSB4, and CCB4 corresponds to SSB6. At this point, the UE completes the CCB time domain information acquisition and reception.

Also, the PBCH may also indicate the frequency domain resources of the CCB, and the UE can determine the time domain position of the CCB. The UE may also determine the frequency domain position of the CCB according to the PBCH indication.

Figure 7:
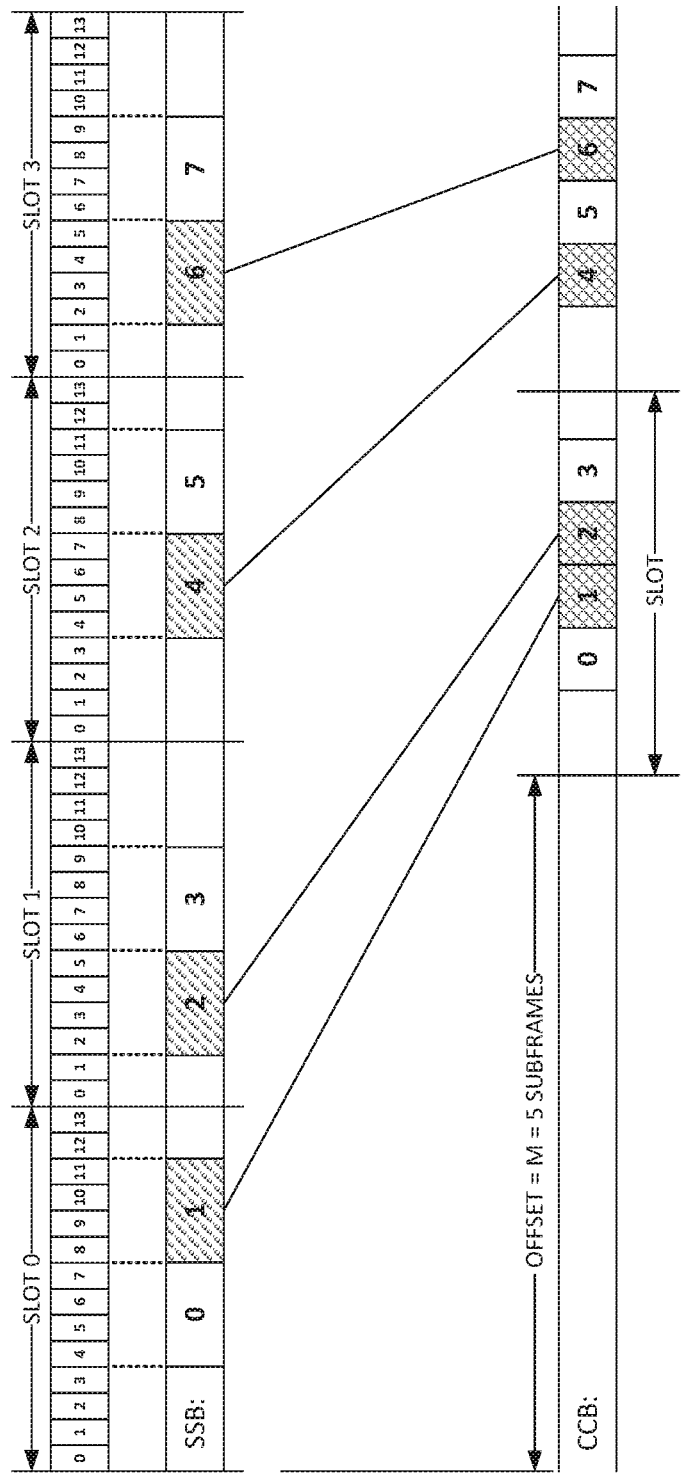
FIG. 7 shows another illustrative example of a mapping pattern between OFDM symbols, SSBs and CCBs, utilizing a one-to-one correlation between SSBs and CCBs.

According to some embodiments, a direct relationship exists between SSBs and CCBs, as shown in FIG. 7. The number of potential SSBs is again L=8 (that is, SSB indexes of 0-7), and each SSB occupies 4 consecutive OFDM symbols. The SSB mapping to the data transmission slots and CCBs is summarized in Table 3, below. The mapping mode is known to the network side (e.g., the BS) and the UE.

TABLE 3

|      | Slot No. | OFDM Symbols | CCB No. |
|------|----------|--------------|---------|
| SSB0 | 0        | 4-7          | 0       |
| SSB1 | 0        | 8-11         | 1       |
| SSB2 | 1        | 2-5          | 2       |
| SSB3 | 1        | 6-9          | 3       |
| SSB4 | 2        | 4-7          | 4       |
| SSB5 | 2        | 8-11         | 5       |
| SSB6 | 3        | 2-5          | 6       |
| SSB7 | 3        | 6-9          | 7       |

In the present example, the SSBs to be transmitted correspond directly to one CCB, on a one-to-one basis. That is, SSB0 corresponds to CCB0, SSB1 corresponds to CCB1, and so on. When the SSBs 1, 2, 4, 6 are actually transmitted, the CCB corresponding to the same index will be actually transmitted accordingly.

As shown in FIG. 7, the mapping pattern of the potential CCBs to the data transmission slots is also predefined, assuming that the CCB occupies two symbols, where CCB 0, 1, 2, 3 are mapped to symbols 4 to 5, symbols 6 to 7, symbols 8 to 9, and symbols 10 to 11 in slot 0; CCBs 4, 5, 6, 7 are mapped to symbols 2 to 3, symbols 4 to 5, symbols 6 to 7 and symbols 8 to 9 in slot 1.

The PBCH-specific time domain location information transmitted on the PBCH is as follows:

CCB time domain start point: offset from SS block starting point to 5 subframes (i.e., 5 ms in the present example).

After receiving the time domain location information on the PBCH with the SSB, the UE obtains the above information and can directly find the CCB time domain start point. Then, the UE judges the CCB corresponding to the received SSB. In the SSB, the UE obtains other information such as the SSB index for the SSB received. For example, the SSB index is indicated by PBCH DMRS and defines eight different DMRS sequences. The UE can determine the current SSB by detecting the current PBCH DMRS sequence Index. For the present example, if the UE recognizes that the current SSB index is 4, the UE further determines that the CCB corresponding to SSB4 is CCB4.

The specific time domain resource position of the CCB4 is determined according to the mapping pattern of the CCB to the data transmission slot, e.g., the symbols 2 to 3 of the second slot starting from the CCB time domain start point. The UE receives the CCB, and the UE completes the acquisition and reception of the CCB time domain information.

The PBCH may also indicate the frequency domain resources of the CCB, and the UE may determine the time domain position of the CCB. The UE may also determine the frequency domain position of the CCB according to the PBCH indication.

Figure 8:
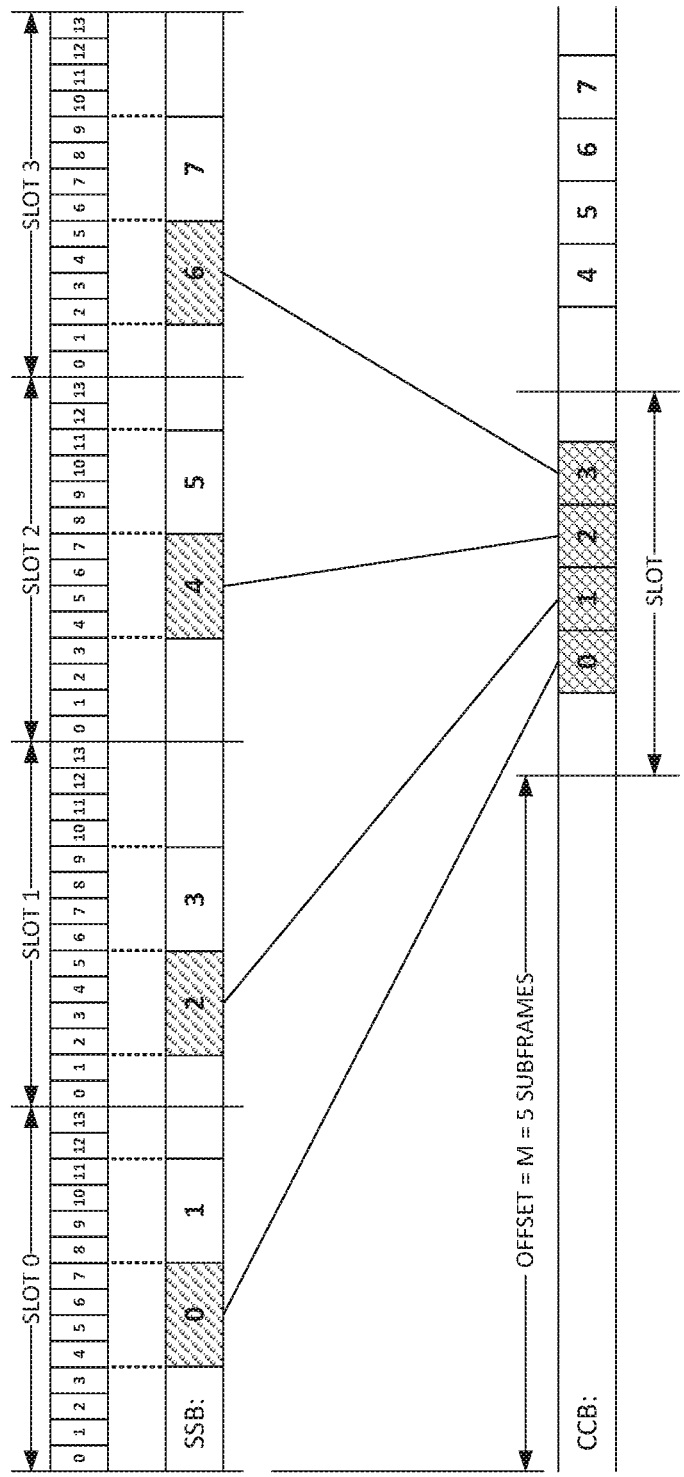
FIG. 8 shows another illustrative example of a mapping pattern between OFDM symbols, SSBs and CCBs, utilizing a one-to-one correlation between SSBs and CCBs, but with the CCBs concentrated.

Similar to the embodiments described with reference to FIG. 7, above, some embodiments can utilize a direct, one-to-one correlation between the SSBs and CCBs, but also concentrate the CCBs. FIG. 8 illustrates embodiments utilizing SSBs to be transmitted that correspond to CCBs on a one-to-one basis, with the CCBs concentrated. Table 4 summarizes the relationships of each SSB with its respective slot, OFDM symbols, and CCBs.

TABLE 4

| | Slot No. | OFDM Symbols | CCB No. |
|---|---|---|---|
| SSB0 | 0 | 4-7 | 0 |
| SSB1 | 0 | 8-11 | NULL |
| SSB2 | 1 | 2-5 | 1 |
| SSB3 | 1 | 6-9 | NULL |
| SSB4 | 2 | 4-7 | 2 |
| SSB5 | 2 | 8-11 | NULL |
| SSB6 | 3 | 2-5 | 3 |
| SSB7 | 3 | 6-9 | NULL |

From Table 4, it can be seen that SSB0 corresponds to CCB0, SSB2 corresponds to CCB1, SSB4 corresponds to CCB2, and SSB6 corresponds to CCB3. To notify the UE of the predefined pattern of the actual transmission SSBs, as shown in FIG. 6, the BS has seven pre-defined SSB actual transmission patterns. A 3-bit identifier transmitted on the PBCH to the UE indicates that the current SSB pattern being used is again "B-SSB."

As shown in FIG. 8, the mapping pattern of the CCB to the data transmission slot is also predefined. It can be seen in FIG. 8 that, if each CCB occupies two symbols, CCB0 occupies symbols 4 to 5 of slot 0; CCB1 occupies symbols 6 to 7 of slot 0; CCB2 occupies symbols 8 to 9 of slot 0; and CCB3 occupies symbols 10 to 11 of slot 0. Similarly, CCB4 occupies symbols 2 to 3 of slot 1; CCB5 occupies symbols 4 to 5 of slot 1; CCB6 occupies symbols 6 to 7 of slot 1; and CCB7 occupies symbols 8 to 9 of slot 1.

For the present example, the PBCH-specific time domain location information transmitted on the PBCH is as follows:

CCB time domain start point: offset from SSB starting point to 5 subframes (i.e. 5 ms);

The mapping pattern of CCB to data transmission slot is as shown in FIG. 8;

The actual transmission SSB pattern is as shown in FIG. 8.

After receiving the time domain location information on the PBCH with the SSB, the UE obtains the above information and can directly find the CCB time domain start point. Then, the UE judges the CCB corresponding to the received SSB. In the SSB, the UE obtains other information such as the SSB index for the received SSB. For example, the SSB index can be indicated by PBCH DMRS and defines eight different DMRS sequences. The UE can determine the current SSB by detecting the current PBCH DMRS sequence index. For example, if the UE identifies the current SSB index as 4, from the actual transmission SSB pattern shown in FIG. 8, SSB index is 4 corresponds to the third SSB actually transmitted. The UE can then determine the specific time domain location of the CCB 3 according to the mapping pattern of the CCB to the data transmission slot. The UE receives CCB 3, and thus the UE completes the acquisition and reception of the CCB time domain information.

The PBCH may also indicate the frequency domain resources of the CCB, and the terminal may determine the time domain position of the CCB. It may also be desirable to determine the frequency domain position of the CCB according to the PBCH indication.

Figure 9:
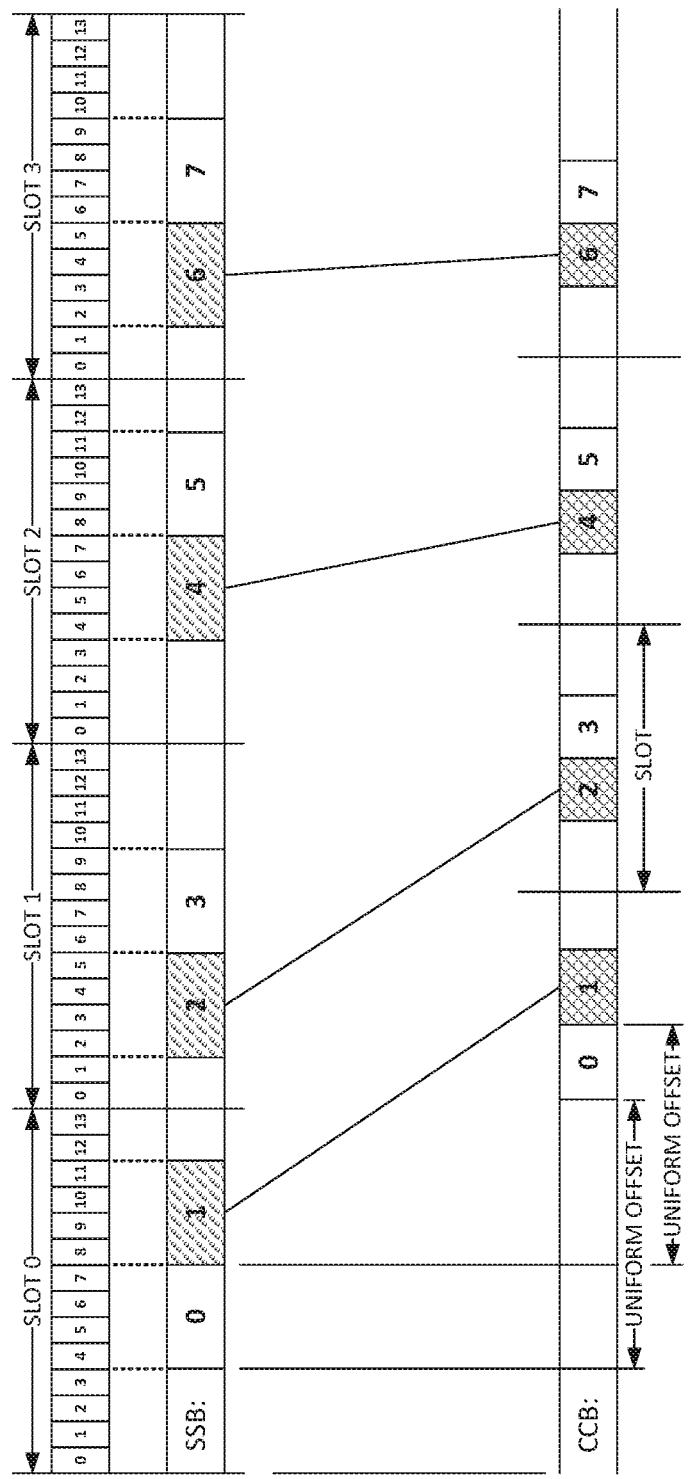
FIG. 9 shows another illustrative example of a mapping pattern between OFDM symbols, SSBs and CCBs, utilizing a unified time domain offset between each SSB and the corresponding CCB.

Some embodiments may utilize a unified time domain offset between each SSB and the corresponding CCB. With reference to FIG. 9, the mapping pattern of the CCB to the data transmission slot is the same as the mapping pattern of the SSB to the data transmission slot. There is also a unified time domain offset between each SSB and its corresponding CCB.

Specifically, the number of latent SSBs is L=8 (that is, SSB indexes of 0-7), and each SSB occupies four (4) consecutive OFDM symbols. The mapping of each SSB to its OFDM symbols and corresponding CCB in FIG. 9 is summarized in Table 5, below.

TABLE 5

| | Slot No. | OFDM Symbols | CCB No. |
|---|---|---|---|
| SSB0 | 0 | 4-7 | 0 |
| SSB1 | 0 | 8-11 | 1 |
| SSB2 | 1 | 2-5 | 2 |
| SSB3 | 1 | 6-9 | 3 |
| SSB4 | 2 | 4-7 | 4 |
| SSB5 | 2 | 8-11 | 5 |
| SSB6 | 3 | 2-5 | 6 |
| SSB7 | 3 | 6-9 | 7 |

Each of the potential SSBs has one corresponding CCB that is mapped to the same data transmission slots as its respective SSB. In other words, from the beginning of the CCB time domain, CCB0 is mapped to symbols 4 to 7 of slot 0; CCB1 is mapped to symbols 8 to 11 of slot 0; CCB2 is mapped to symbols 2 to 5 in slot 1; CCB3 is mapped to symbols 6 to 9 of slot 1; CCB4 is mapped to symbols 4 to 7 of slot 2; CCB5 is mapped to symbols 8 to 11 of slot 2; CCB6 is mapped to symbols 2 to 5 of slot 3; and CCB7 is mapped to symbols 6 to 9 of slot 3.

For the present example, the PBCH-specific time domain location information transmitted on the PBCH to convey the CCB time domain information is as follows:

CCB and corresponding SSB time domain offset: 5 subframes (i.e., 5 ms).

After receiving the time domain location information on the PBCH with the SSB, the UE obtains the above information and directly determines the time domain position of the CCB corresponding to the received SSB based on the uniform offset of each CCB relative to its corresponding SSB. The UE does not need to obtain additional SSB index information as described for some embodiments above.

Figure 10:
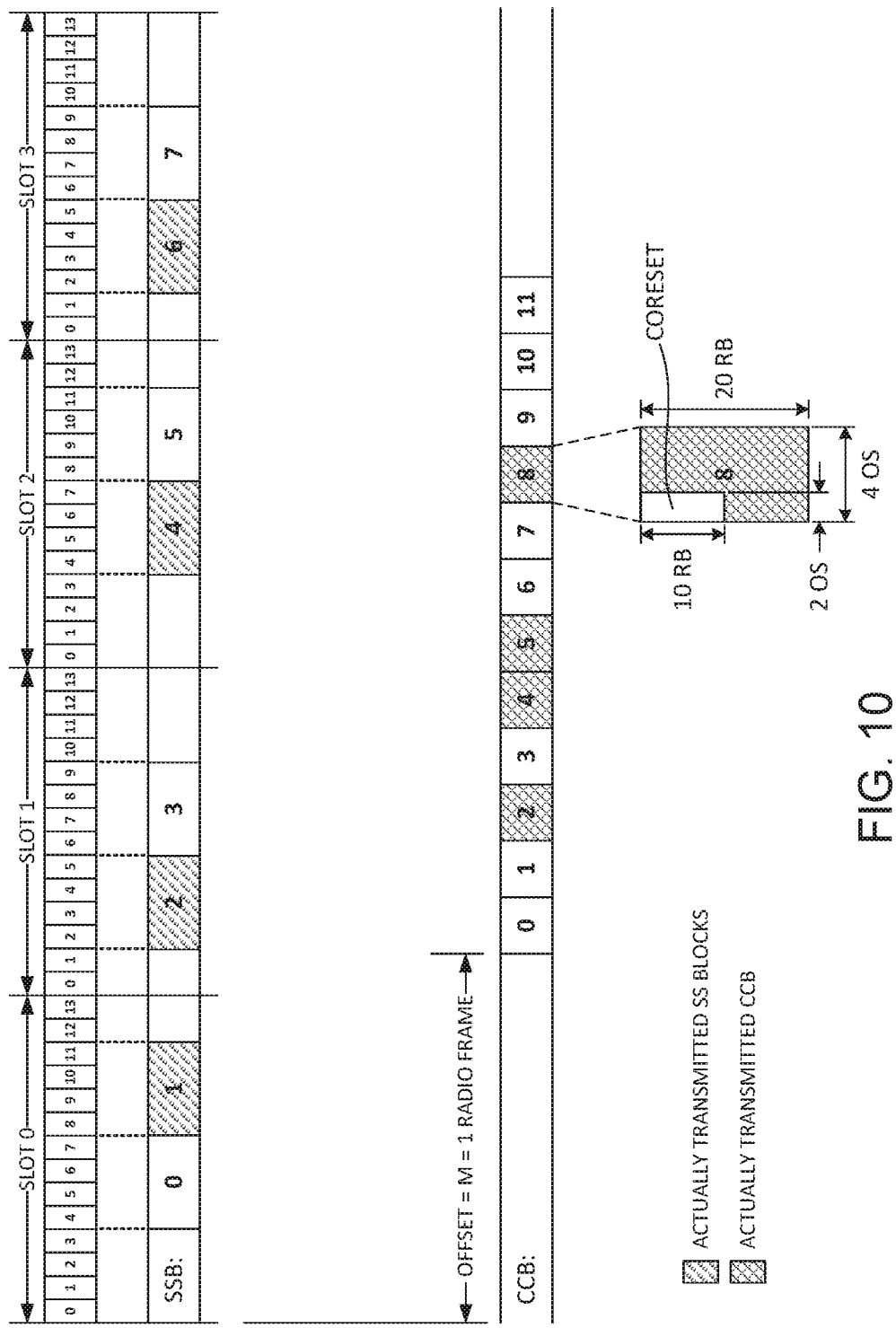
FIG. 10 shows another illustrative example of a mapping pattern between OFDM symbols and SSBs, without a predefined mapping pattern between CCBs and the OFDM symbols.

Some embodiments do not have a predefined mapping pattern between the CCBs and the OFDM symbols, as shown in FIG. 10. FIG. 10 shows the SSBs mapped to the OFDM symbols. SSB0 maps to symbols 4 to 7 of slot 0; SSB1 maps to symbols 8 to 11 of slot 0; SSB2 maps to symbols 2 to 5 of slot 1; SSB3 maps to symbols 6 to 9 of slot 1; SSB4 maps to symbols 4 to 7 of slot 2; SSB5 maps to symbols 8 to 11 of slot 2; SSB6 maps to symbols 2 to 5 of slot 3; and SSB7 maps to symbols 6 to 9 of slot 3. This mapping mode is known to the network side (e.g., the BS) and the UE.

In the present embodiments, the CCB does not have a predefined mapping pattern to the OFDM symbols. Thus, the time domain location information transmitted on the PBCH indicates the following information:

CCB time domain start point: with the first SSB where the time slot is shifted to 1 radio frame (10 ms);

Monitoring period: 4 symbols, that is, the UE from the CCB time domain start position, conducts a blind attempt to detect the CCB every 4 OFDM symbols until the successful detection of downlink control information, or to achieve a maximum number of attempts to detect the CCB (e.g., when the terminal reaches the upper limit of the number of times the CCB does not successfully detect the downlink control information, the detection failure is considered). The upper limit of attempts at blind detection of the CCB can be set to any desired value, but is 12 for the present example, which causes the UE to attempt to blind detect the CCB 12 times from the CCB time domain start position.

The configuration of the common CORESET in the CCB includes the following configuration information: As shown in FIG. 10, the number of symbols occupied by the CORESET in the CCB is two OFDM symbols (2 OS), which establishes the CORESET as the first two symbols of the CCB. The number of resource units occupied by the CORESET is 10 resource blocks (10 RB), which establishes that the CORESET occupies the 10 highest index RBs in the CCB.

The UE successfully detects the SSB1 on the PBCH. The configuration information of the CCB is read in the PBCH. Further, the location of the first potential CCB is found according to the time domain start information of the CCB. If the downlink control information is not detected in common CORESET of the first potential CCB, the above detection process is repeated at the second potential CCB corresponding to the fifth symbol, and so on, and finally succeeds in the third potential CCB to detect the downlink control information. The UE completes the acquisition and reception of CCB time domain information.

The number of potential CCBs is redundant, so that the actual transmitted CCBs resource can be chose by BS from potential CCBs. Some CCBs can be skipped, and can be used for transmission of other data or control information.

Further, the PBCH may also indicate the frequency domain resources of the CCB, and the UE may determine the time domain position of the CCB. It may be desirable to determine the frequency domain position of the CCB according to the indication transmitted on the PBCH.

Figure 11:
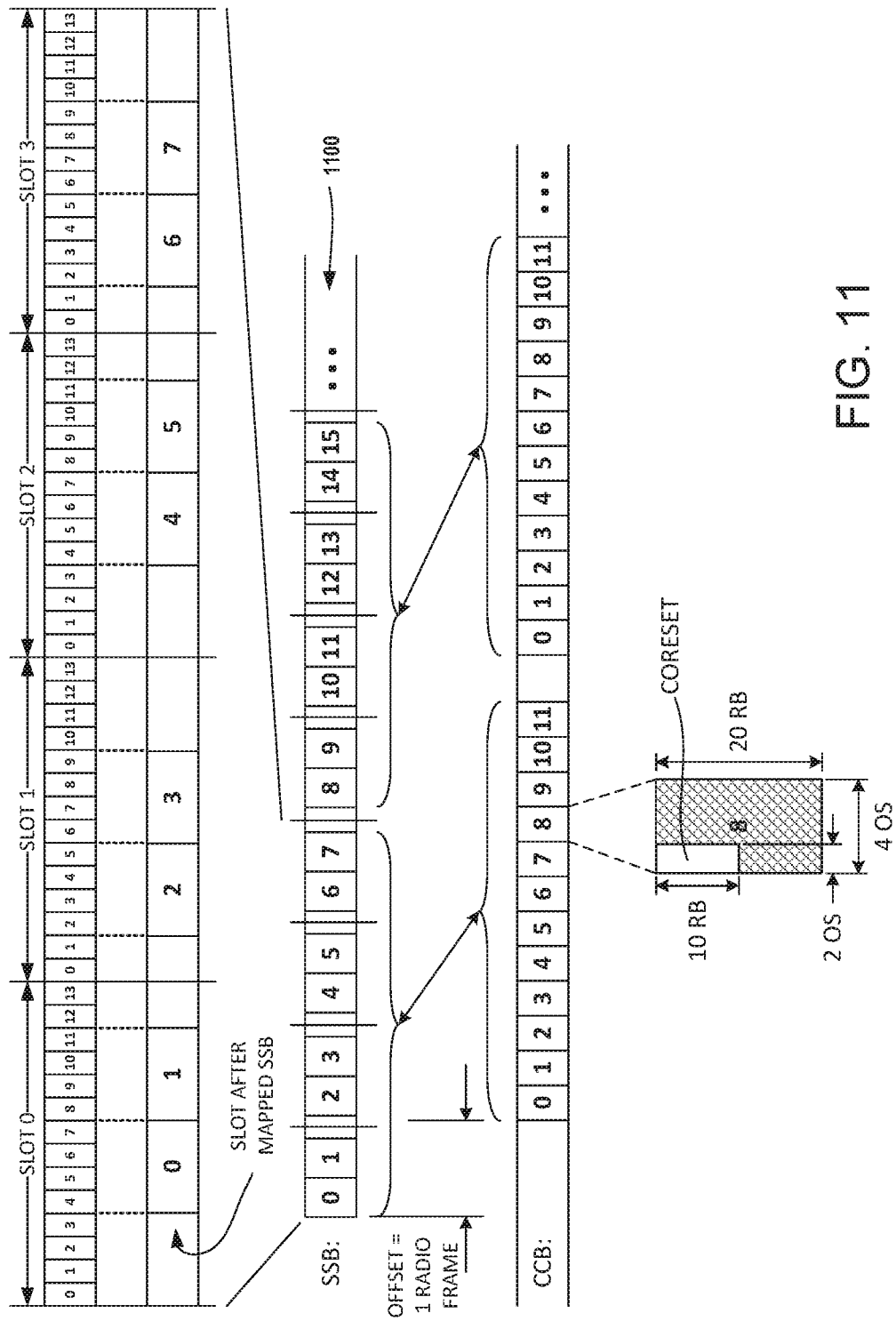
FIG. 11 shows another illustrative example of a mapping pattern between OFDM symbols and SSBs, without a predefined mapping pattern between CCBs and the OFDM symbols.

FIG. 11 shows another illustrative example of a mapping pattern between OFDM symbols and SSBs, without a predefined mapping pattern between CCBs and the OFDM symbols. In FIG. 11, the number of SSBs is L=16 (that is, SSB indexes of 0-15), each SSB occupies 4 consecutive OFDM symbols, mapped as shown in FIG. 11. SSB0 is mapped to symbols 4 to 7 in slot 0; SSB1 is mapped to symbols 8 through 11 of slot 0; SSB2 is mapped to symbols 2 to 5 in slot 1; SSB3 is mapped to symbols 6 to 9 of slot 1; SSB4 is mapped to symbols 4 to 7 of slot 2; SSB5 is mapped to symbols 8 to 11 of slot 2; SSB6 is mapped to symbols 2 to 5 of slot 3; and SSB7 is mapped to symbols 6 to 9 of slot 3. A layer 1100 of eight (8) succeeding SSBs are grouped, and mapped to the SSBs mapped directly to the OFDM symbols described above for the present example. The mapping pattern of the SSB to the OFDM symbols and the mapping pattern of the SSBs in the layer 1100 to those SSBs mapped to the OFDM symbols are known to the network side (e.g., BS) and the UE.

In the present example, the CCBs do not have a predefined mapping pattern to the OFDM symbols. Each set of SSBs in the layer 110 corresponds to a set of 12 potential CCB resources, and the time domain location information transmitted with the SSB on the PBCH for the same set of SSBs contains the same content. The different sets of CCBs correspond to different time domain location information for the respective CCBs. Since the CCB configuration information to be indicated may be different (for example, CCB time domain start point and other information), time domain location information on the PBCH belonging to different groups of SSBs may be different (e.g., the content of the group of SSBs such as SSBs 0-7 is the same, but different than the content of another group of SSBs).

For each set of SSBs, the PBCH indicates the CCB configuration information in the same manner as described above with respect to FIG. 10, so this process will not be described again.

For some embodiments, the CCB is frequency division multiplexing with SSB with the same downlink antenna port, such as when the CCB and the corresponding SSB has a time domain offset 0. For such embodiments, the time domain location information for the CCB includes:

CCB start point in time domain: time offset of CCB and the corresponding SSB is 0.

Because CCB and SSB are arranged in a one-to-one correspondence, blind detection of a number of potential CCB resources is not needed. The monitoring cycle indication field is invalid.

The upper limit of CCB monitoring is 1, or the upper limit of CCB monitoring is invalid.

The configuration of the common CORESET in the CCB includes the following configuration information: As shown in FIG. 11, the number of symbols occupied by the common control resource set in the CCB is two OFDM symbols (2

OS), the CORESET constitutes the first two symbols of the CCB, the number of resource units occupied by the common control resource set is 10 resource blocks (RBs), and the CORESET is located in the 10 resource blocks with the highest index in the CCB.

The UE successfully detects the synchronization signal and PBCH on the SSB1. The configuration information of the CCB is read from the PBCH. Further, the CCB is set according to the time domain start information of the CCB, and the CORESET is blind detection is unnecessary. The UE then completes the acquisition and reception of CCB time domain location information.

After receiving the SSB on the PBCH, the UE obtains the above information and can directly find the CCB corresponding to the received SSB. At this point, the UE does not need to obtain additional SSB index.

The CCB time domain location information indication mode corresponding to the present embodiment is described in detail with reference to FIGS. 13-15. Consider CCB mapping in two locations, one part of which is mapped on one or both sides of the SSB frequency domain, and the other part is mapped on another time domain position. By this mapping, the sweeping duration of the second part of the CCB can be reduced, thereby reducing the impact on other data and controls.

In some embodiments, UE can be indicated the current CCB is mapped to two locations or one location via PBCH or PDCCH within corresponding common CORESET. For example, one bit in PBCH can be used for such indication, which the value of such bit '0' represent 'the current CCB is mapped to two locations', and the value of such bit '1' represent 'the current CCB is mapped to one locations'.

Figure 13:
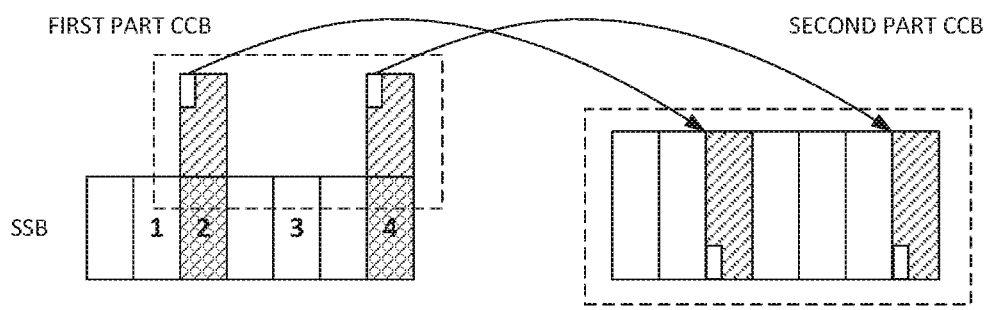
FIGS. 13-15 are block diagrams illustrating a domain location information indication mode.

The multiplexing method, one way of implementation is that the two parts of the CCB, a first part and a second part, have their own set of common control resources (e.g., resource blocks), as shown in FIG. 13. Another way to do this is that the two-part CCB uses the downlink control information within the same common CORESET for scheduling, as shown in FIGS. 14 and 15.

Figure 12:
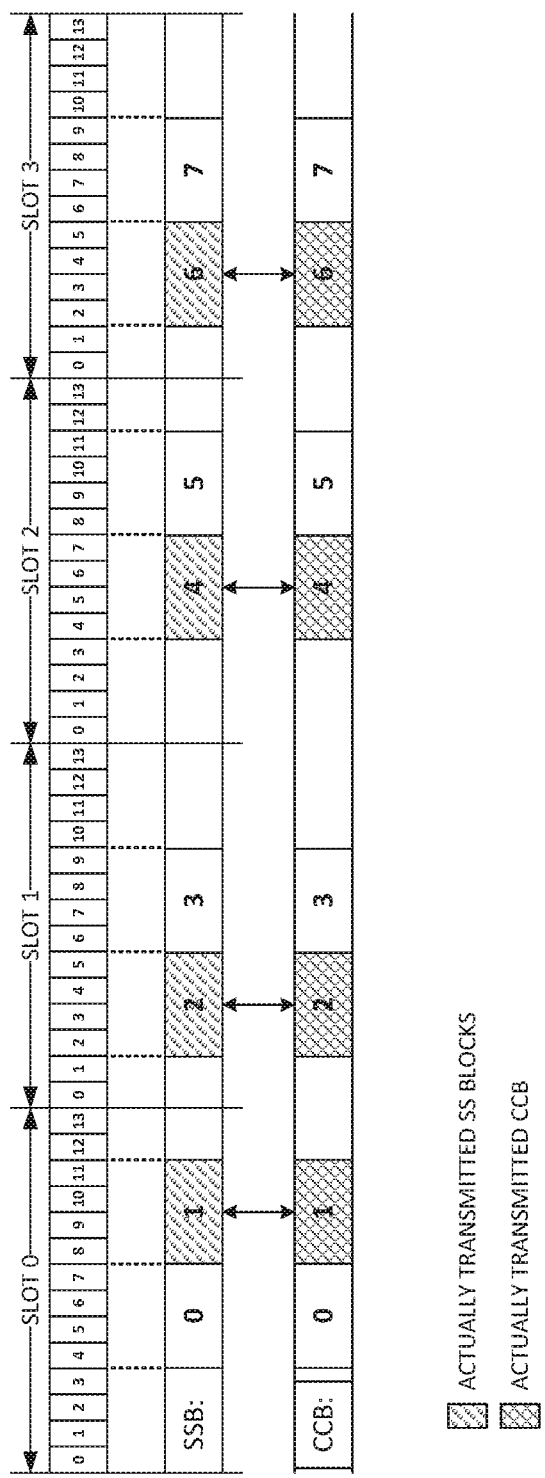
FIG. 12 shows another illustrative example of a mapping pattern, where a CCB block synchronization signal corresponds to frequency division multiplexing, such as when the CCB synchronization signal is a time domain offset 0.

In the mode shown in FIG. 13, it is necessary to indicate two CCB configuration information on the PBCH, and the configuration of the CCB with the SSB frequency division multiplexing is the same as that described with reference to FIG. 12, above. The configuration of the second part of the CCB may according to any of the embodiments described herein, and will not be described again at this point.

After the UE successfully detects the downlink control information in each part of the CCB, the UE further receives the information (such as RMSI, or paging message) in the CCB according to the instructions of the downlink control information.

Figure 14:
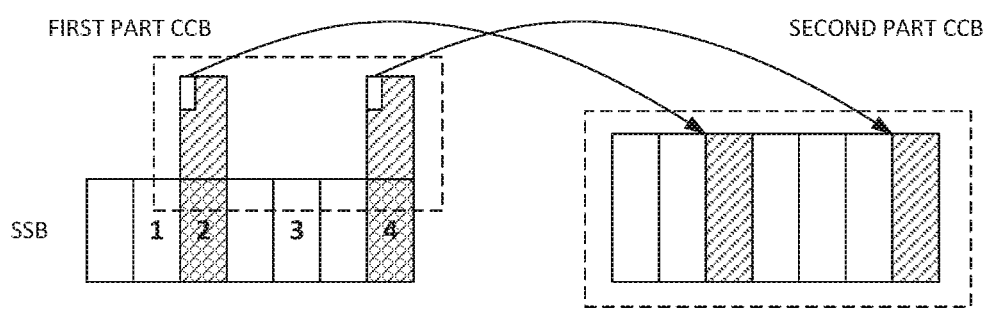

In the mode shown in FIG. 14, only the first part CCB configuration information is transmitted on the PBCH in the same manner as the technique described with regard to FIG. 10 above. After the UE successfully detects the downlink control information in the first part of the CCB, the UE further receives the information (such as RMSI, or paging message) distributed in the second part of the CCB according to the instruction of the downlink control information.

Figure 15:
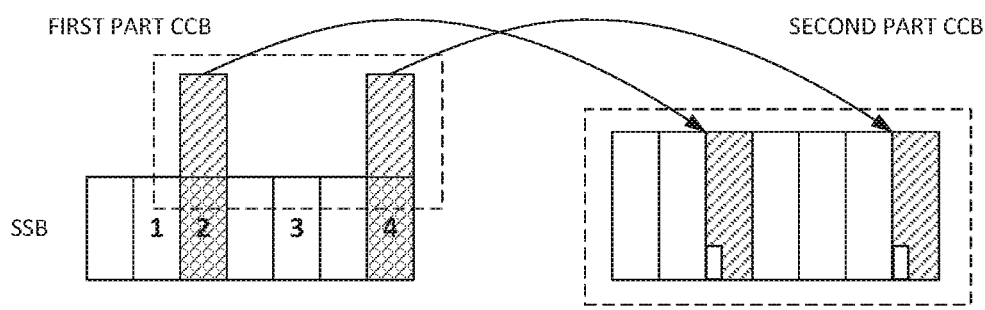

In the mode shown in FIG. 15, only the second part of the CCB configuration information is indicated in the transmission on the PBCH, according to any of the embodiments described herein. After the UE successfully detects the downlink control information in the second part of the CCB, the UE further receives the data (such as RMSI, or paging message) distributed in the two parts of the CCB according to the instruction of the downlink control information.

The information in the two parts of the CCB can be the same or different information. When the two parts contain different information, the UE needs to successfully decode the two parts of the information, and then obtain the complete information. When the two parts of the CCB contain the same information, the information in the two parts of the CCB can be used in different redundancy versions (Redundancy Version, RV), or simply duplication of information. The UE may only receive one part of the CCB to get complete information (such as RMSI, or paging message, etc.). The UE may also receive two parts of the CCB and perform Incremental Redundantcy (IR) combination, or Chase Combining (CC). Thereby improving reception performance.

Figure 16:
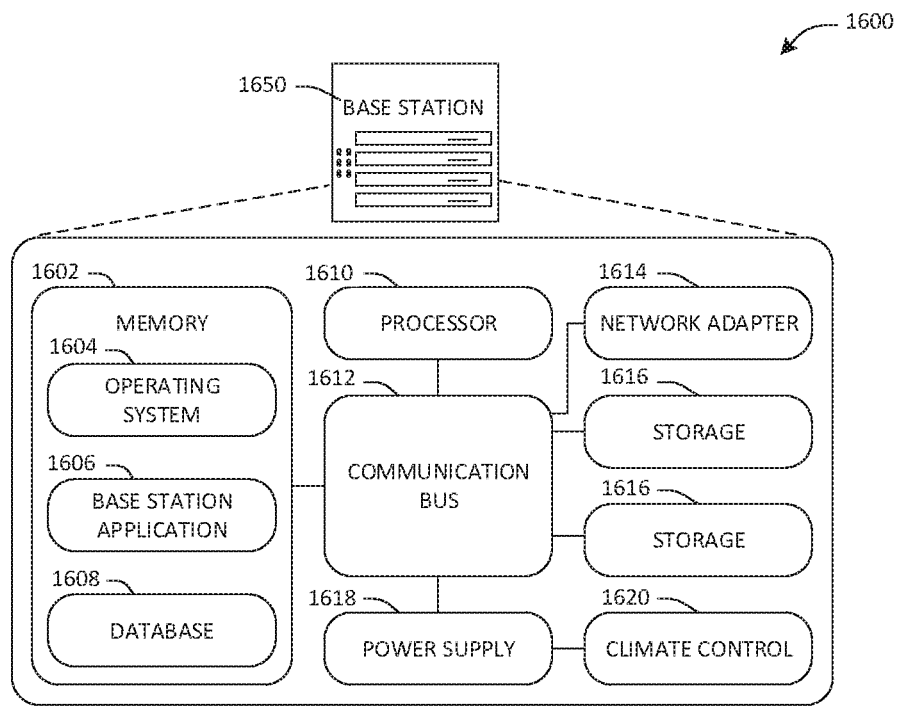
FIG. 16 is an illustration of a scenario involving an example configuration of a base station (BS) that may utilize and/or implement at least a portion of the techniques presented herein.

FIG. 16 presents a schematic architecture diagram 1600 of a base station 1650 (e.g., a network entity) that may utilize at least a portion of the techniques provided herein. Such a base station 1650 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 1650 may connect one or more user equipment (UE) to a (e.g., wireless and/or wired) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA2000, Global System for Mobile Communications (GSM), Evolved UTRA (E-UTRA), IEEE 802.11, IEEE 802.16, IEEE 802.20, Flash-OFDM, etc. The BS and/or the UE may communicate using a standard, such as Long-Term Evolution (LTE), 5G New Radio (NR), etc.

The base station 1650 may comprise one or more (e.g., hardware) processors 1610 that process instructions. The one or more processors 1610 may optionally include a plurality of cores; one or more coprocessors, such as a mathematics coprocessor or an integrated graphical processing unit (GPU); and/or one or more layers of local cache memory. The base station 1650 may comprise memory 1602 storing various forms of applications, such as an operating system 1604; one or more base station applications 1606; and/or various forms of data, such as a database 1608 and/or a file system, etc. The base station 1650 may comprise a variety of peripheral components, such as a wired and/or wireless network adapter 1614 connectible to a local area network and/or wide area network; one or more storage components 1616, such as a hard disk drive, a solid-state storage device (SSD), a flash memory device, and/or a magnetic and/or optical disk reader; and/or other peripheral components.

The base station 1650 may comprise a mainboard featuring one or more communication buses 1612 that interconnect the processor 1610, the memory 1602, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1612 may interconnect the base station 1650 with at least one other server. Other components that may optionally be included with the base station 1650 (though not shown in the schematic diagram 1600 of FIG. 16) include a display; a display adapter, such as a graphical processing unit (GPU); input peripherals, such as a keyboard and/or mouse; and/or a flash memory device that may store a basic input/output system (BIOS) routine that facilitates booting the base station 1650 to a state of readiness, etc.

The base station 1650 may operate in various physical enclosures, such as a desktop or tower, and/or may be integrated with a display as an "all-in-one" device. The base station 1650 may be mounted horizontally and/or in a cabinet or rack, and/or may simply comprise an interconnected set of components. The base station 1650 may comprise a dedicated and/or shared power supply 1618 that supplies and/or regulates power for the other components. The base station 1650 may provide power to and/or receive power from another base station and/or server and/or other devices. The base station 1650 may comprise a shared and/or dedicated climate control unit 1620 that regulates climate properties, such as temperature, humidity, and/or airflow. Many such base stations 1650 may be configured and/or adapted to utilize at least a portion of the techniques presented herein.

Figure 17:
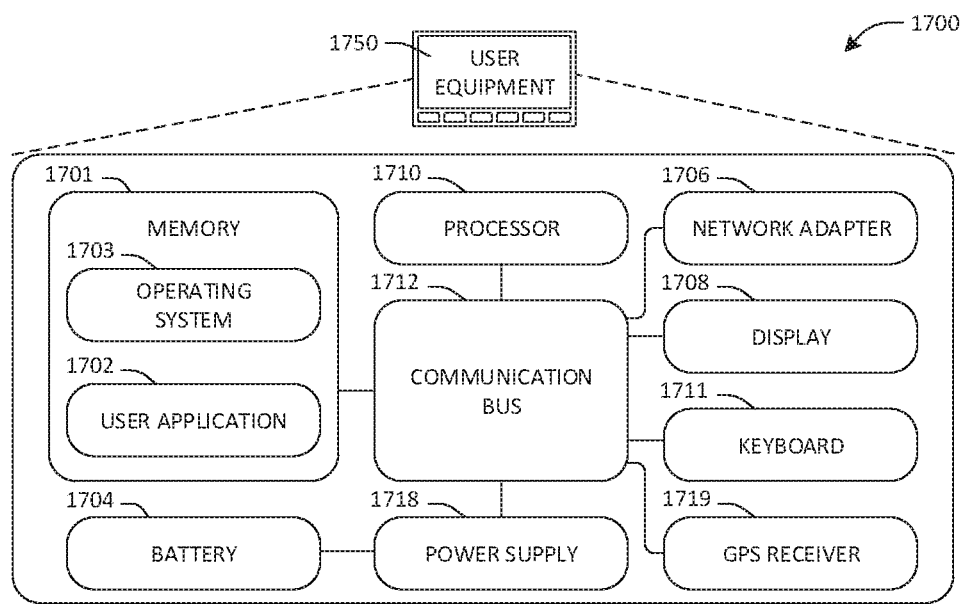
FIG. 17 is an illustration of a scenario involving an example configuration of a user equipment (UE) that may utilize and/or implement at least a portion of the techniques presented herein.

FIG. 17 presents a schematic architecture diagram 1700 of a user equipment (UE) 1750 (e.g., a communication device) whereupon at least a portion of the techniques presented herein may be implemented. Such a UE 1750 may vary widely in configuration and/or capabilities, in order to provide a variety of functionality to a user. The UE 1750 may be provided in a variety of form factors, such as a mobile phone (e.g., a smartphone); a desktop or tower workstation; an "all-in-one" device integrated with a display 1708; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 1750 may serve the user in a variety of roles, such as a telephone, a workstation, kiosk, media player, gaming device, and/or appliance.

The UE 1750 may comprise one or more (e.g., hardware) processors 1710 that process instructions. The one or more processors 1710 may optionally include a plurality of cores; one or more coprocessors, such as a mathematics coprocessor or an integrated graphical processing unit (GPU); and/or one or more layers of local cache memory. The UE 1750 may comprise memory 1701 storing various forms of applications, such as an operating system 1703; one or more user applications 1702, such as document applications, media applications, file and/or data access applications, communication applications, such as web browsers and/or email clients, utilities, and/or games; and/or drivers for various peripherals. The UE 1750 may comprise a variety of peripheral components, such as a wired and/or wireless network adapter 1706 connectible to a local area network and/or wide area network; one or more output components, such as a display 1708 coupled with a display adapter (optionally including a graphical processing unit (GPU)), a sound adapter coupled with a speaker, and/or a printer; input devices for receiving input from the user, such as a keyboard 1711, a mouse, a microphone, a camera, and/or a touch-sensitive component of the display 1708; and/or environmental sensors, such as a GPS receiver 1719 that detects the location, velocity, and/or acceleration of the UE 1750, a compass, accelerometer, and/or gyroscope that detects a physical orientation of the UE 1750. Other components that may optionally be included with the UE 1750 (though not shown in the schematic architecture diagram 1700 of FIG. 17) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 1750 to a state of readiness; and/or a climate control unit that regulates climate properties, such as temperature, humidity, and airflow, etc.

The UE 1750 may comprise a mainboard featuring one or more communication buses 1712 that interconnect the processor 1710, the memory 1701, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 1750 may comprise a dedicated and/or shared power supply 1718 that supplies and/or regulates power for other components, and/or a battery 1704 that stores power for use while the UE 1750 is not connected to a power source via the power supply 1718. The UE 1750 may provide power to and/or receive power from other client devices.

Figure 18:
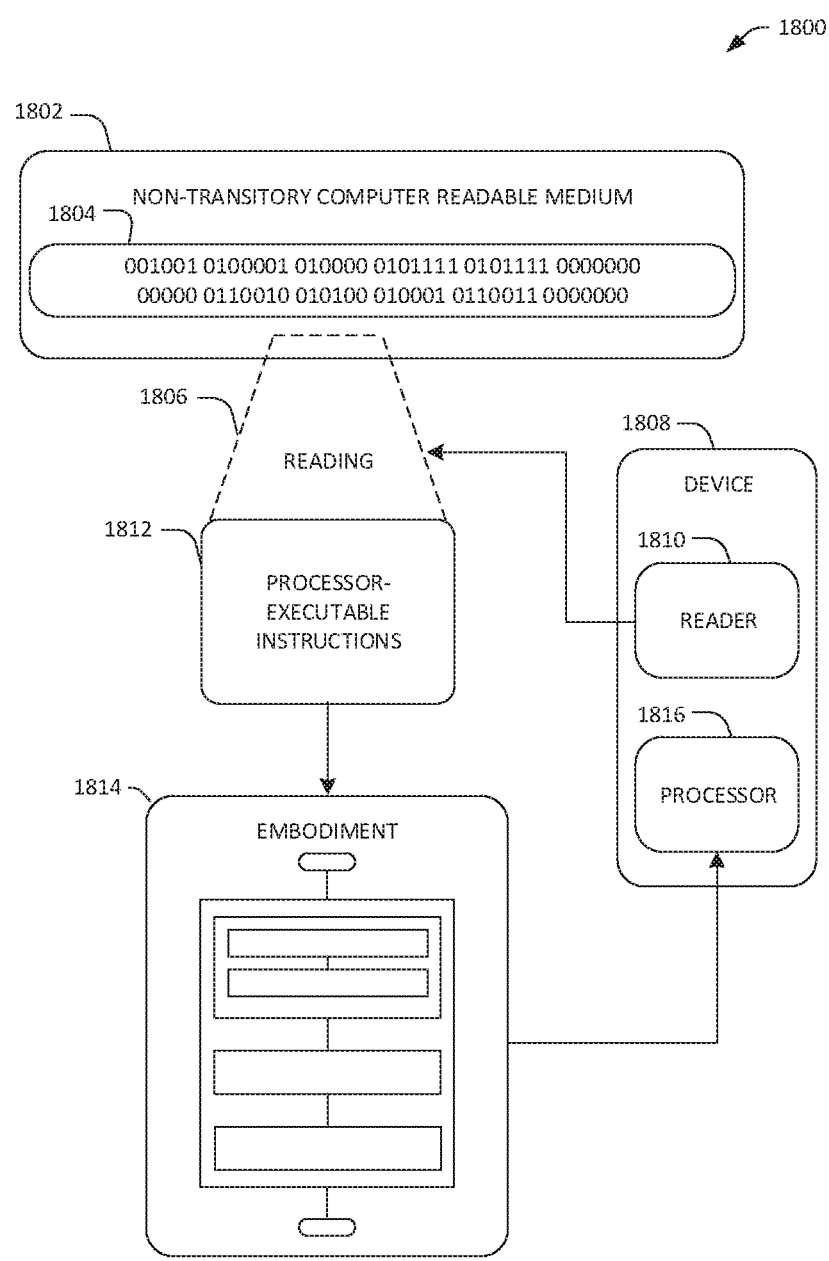
FIG. 18 is an illustration of a scenario featuring an example non-transitory computer readable medium in accordance with one or more of the provisions set forth herein.

FIG. 18 is an illustration of a scenario 1800 involving an example non-transitory computer readable medium 1802. The non-transitory computer readable medium 1802 may comprise processor-executable instructions 1812 that when executed by a processor 1816 cause performance (e.g., by the processor 1816) of at least some of the provisions herein. The non-transitory computer readable medium 1802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 1802 stores computer-readable data 1804 that, when subjected to reading 1806 by a reader 1810 of a device 1808 (e.g., a read head of a hard disk drive, or a read operation invoked on a solid-state storage device), express the processor-executable instructions 1812. In some embodiments, the processor-executable instructions 1812, when executed, cause performance of operations, such as at least some of the example method of FIGS. 2 and 3, for example. In some embodiments, the processor-executable instructions 1812 are configured to cause implementation of a system and/or scenario, such as at least some of the exemplary system described herein.

As used in this application, "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example," "illustrative embodiment," are used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A wireless communication method comprising:
   transmitting system information on a broadcast channel to a user device, wherein the system information includes a time domain start point of a common control block and a pattern of synchronization signal blocks, wherein the pattern of synchronization signal blocks comprises a first bitmap indicating one or more synchronization signal blocks transmitted within a synchronization signal block group, and a second bitmap indicating one or more transmitted synchronization signal block groups; and
   performing a transmission with the user device according to the system information,
   wherein each of the one or more transmitted synchronization signal block groups indicated by the second bitmap is transmitted according to the first bitmap.

2. A wireless communication method comprising:
   receiving system information from a base station on a broadcast channel, wherein the system information includes a time domain start point of a common control block and a pattern of synchronization signal blocks, wherein the pattern of synchronization signal blocks comprises a first bitmap indicating one or more synchronization signal blocks transmitted within a synchronization signal block group, and a second bitmap indicating one or more transmitted synchronization signal block groups; and
   performing a transmission with the base station according to the system information,
   wherein each of the one or more transmitted synchronization signal block groups indicated by the second bitmap is transmitted according to the first bitmap.

3. A wireless communication device comprising:
   a processor; and
   a memory comprising processor-executable instructions that when executed by the processor cause the processor to:
   transmit system information to a user device on a broadcast channel, wherein the system information includes a time domain start point of a common control block and a pattern of synchronization signal blocks, wherein the pattern of synchronization signal blocks comprises a first bitmap indicating one or more synchronization signal blocks transmitted within a synchronization signal block group, and a second bitmap indicating one or more transmitted synchronization signal block groups; and
   perform a transmission with the user device according to the system information,
   wherein each of the one or more transmitted synchronization signal block groups indicated by the second bitmap is transmitted according to the first bitmap.

4. A wireless communication device comprising:
   a processor; and
   a memory comprising processor-executable instructions that when executed by the processor cause the processor to:
   receive system information from a base station on a broadcast channel, wherein the system information includes a time domain start point of a common control block and a pattern of synchronization signal blocks, wherein the pattern of synchronization signal blocks comprises a first bitmap indicating one or more synchronization signal blocks transmitted within a synchronization signal block group, and a second bitmap indicating one or more transmitted synchronization signal block groups; and
   perform a transmission with the base station according to the system information, wherein each of the one or more transmitted synchronization signal block groups indicated by the second bitmap is transmitted according to the first bitmap.

* * * * *